(12) United States Patent
Kim et al.

(10) Patent No.: US 11,579,725 B2
(45) Date of Patent: Feb. 14, 2023

(54) ELECTRONIC DEVICE

(71) Applicant: Samsung Display Co., Ltd., Yongin-si (KR)

(72) Inventors: Gayoung Kim, Hwaseong-si (KR); Gwang-Bum Ko, Yongin-si (KR); Sanghyun Lim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/513,269

(22) Filed: Oct. 28, 2021

(65) Prior Publication Data
US 2022/0137772 A1  May 5, 2022

(30) Foreign Application Priority Data
Oct. 29, 2020  (KR) .......................... 10-2020-0142136

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05); *G06F 3/0448* (2019.05)

(58) Field of Classification Search
CPC ... G06F 3/0448; G06F 3/0443; G06F 3/04164
See application file for complete search history.

(56) References Cited

U.S. PATENT DOCUMENTS

| | | | |
|---|---|---|---|
| 8,536,880 B2 * | 9/2013 | Philipp | G06F 3/03547 345/173 |
| 8,970,515 B2 | 3/2015 | Moran et al. | |
| 9,323,295 B2 | 4/2016 | Chang et al. | |
| 9,478,189 B2 * | 10/2016 | Lewis | G06F 3/04166 |
| 2011/0248954 A1 * | 10/2011 | Hamada | G06F 3/0448 345/174 |
| 2019/0034010 A1 * | 1/2019 | Lee | G06F 3/0448 |
| 2021/0357056 A1 | 11/2021 | Bum et al. | |

FOREIGN PATENT DOCUMENTS

| | | |
|---|---|---|
| KR | 101471349 | 12/2014 |
| KR | 101786119 | 10/2017 |
| KR | 20210138848 | 11/2021 |

* cited by examiner

*Primary Examiner* — Robin J Mishler
(74) *Attorney, Agent, or Firm* — H.C. Park & Associates, PLC

(57) ABSTRACT

An electronic device includes a first sensing electrode provided in an active region, in which a center is defined, the first sensing electrode including a plurality of first sensing patterns, each of which is spaced apart from the center by a first distance, a second sensing electrode including a plurality of second sensing patterns, each of which is spaced apart from the center by the first distance, a first sensing routing line electrically connected to the first sensing electrode, and a second sensing routing line electrically connected to one of the plurality of second sensing patterns. In the active region, a portion of the first sensing routing line and a portion of the second sensing routing line may have a rotational symmetry.

16 Claims, 12 Drawing Sheets

ELECTRONIC DEVICE

CROSS-REFERENCE TO RELATED APPLICATIONS

This application claims priority from and the benefit of Korean Patent Application No. 10-2020-0142136, filed on Oct. 29, 2020, which is hereby incorporated by reference for all purposes as if fully forth herein.

BACKGROUND OF THE INVENTION

Field

Embodiments of the invention relate generally to an electronic device with improved sensing sensitivity.

Discussion of the Background

Multimedia electronic devices, such as television sets, portable phones, tablet computers, navigation systems, and gaming machines, include a device, which is used to display an image. The electronic devices include a touch-sensing type input sensor, which allows a user to easily input information or commands in an intuitive and easy manner, in addition to conventional input means, such as buttons, a keyboard, and a mouse.

The above information disclosed in this Background section is only for understanding of the background of the inventive concepts, and, therefore, it may contain information that does not constitute prior art.

SUMMARY

It is to be understood that both the foregoing general description and the following detailed description are illustrative and explanatory and are intended to provide further explanation of the invention as claimed.

An embodiment of the inventive concept provides an electronic device with improved sensing sensitivity.

Additional features of the inventive concepts will be set forth in the description which follows, and in part will be apparent from the description, or may be learned by practice of the inventive concepts.

According to an embodiment of the inventive concept, an electronic device may include a first sensing electrode provided in an active region, in which a center is defined, the first sensing electrode including a plurality of first sensing patterns, each of which is spaced apart from the center by a first distance, a second sensing electrode including a plurality of second sensing patterns, each of which is spaced apart from the center by the first distance, a first electrode including a plurality of first patterns, which are arranged in a direction away from the center, a second electrode including a plurality of second patterns, which are arranged in a direction away from the center, a first sensing routing line electrically connected to the first sensing electrode and disposed in the active region and a peripheral region around the active region, and a second sensing routing line electrically connected to one of the plurality of second sensing patterns and disposed in the active region and the peripheral region. In the active region, a portion of the first sensing routing line and a portion of the second sensing routing line may have a rotational symmetry.

In an embodiment, the electronic device may further include a third electrode including a plurality of third patterns arranged in a direction away from the center and a fourth electrode including a plurality of fourth patterns arranged in a direction away from the center. The active region may be divided into four quadrants. The quadrants may have a first quadrant, a second quadrant, a third quadrant, and a fourth quadrant, in which the first electrode, the second electrode, the third electrode, and the fourth electrode are respectively disposed.

In an embodiment, the first electrode may further include a first connection line connecting the plurality of first patterns, the second electrode may further include a second connection line connecting the plurality of second patterns, the third electrode may further include a third connection line connecting the plurality of third patterns, and the fourth electrode may further include a fourth connection line connecting the plurality of fourth patterns. Each of the first connection line, the second connection line, the third connection line, and the fourth connection line may be extended in a direction crossing reference lines, which defines the first to fourth quadrants.

In an embodiment, the electronic device may further include a first routing line electrically connected to the first electrode, a second routing line electrically connected to the second electrode, a third routing line electrically connected to the third electrode, and a fourth routing line electrically connected to the fourth electrode. The first routing line, the second routing line, the third routing line, and the fourth routing line may be disposed in the peripheral region enclosing the active region. The first routing line and the second routing line may be symmetric to each other, about a reference line, which defines the first quadrant and the second quadrant and may be extended in a specific direction. The third routing line and the fourth routing line may be symmetric to each other, about the reference line.

In an embodiment, the active region may include a center region at the center and a first ring region enclosing the center region. The plurality of first sensing patterns and the plurality of second sensing patterns may be disposed in the first ring region. The first sensing electrode may further include a first sensing connection line connecting the plurality of first sensing patterns, and the first sensing connection line may have a shape enclosing a portion of the center region.

In an embodiment, each of the first sensing routing line and the second sensing routing line may have a serpentine shape, in the active region. The first sensing routing line may be extended from the active region to the peripheral region, at one of boundaries between the first fourth quadrants, and the second sensing routing line may be extended from the active region to the peripheral region, at another of the boundaries between the first to fourth quadrants.

In an embodiment, the plurality of second sensing patterns may be spaced apart from each other with the first sensing connection line interposed therebetween.

In an embodiment, the electronic device may further include a second opposite sensing routing line, which is electrically connected to another of the plurality of second sensing patterns. The second opposite sensing routing line may be disposed in one of the first to fourth quadrants.

In an embodiment, the first to fourth quadrants may have borders that are defined by first to fourth boundaries. The first sensing routing line may be extended from the active region to the peripheral region enclosing the active region, at the third boundary, the second sensing routing line may be extended from the active region to the peripheral region at the second boundary, and the second opposite sensing routing line may be extended from the active region to the peripheral region at the fourth boundary.

In an embodiment, in the active region, the first sensing routing line, the second sensing routing line, and the second opposite sensing routing line may be provided to have a rotational symmetry.

In an embodiment, the electronic device may further include a center electrode disposed in the center region and a center routing line electrically connected to the center electrode. The center routing line may have a serpentine shape in two quadrants of the first to fourth quadrants.

In an embodiment, the active region may further include a second ring region enclosing the first ring region. The electronic device may further include a third sensing electrode including two third sensing patterns disposed in the second ring region, a fourth sensing electrode including two fourth sensing patterns disposed in the second ring region, a fifth sensing electrode including four fifth sensing patterns disposed in the second ring region, and a sixth sensing electrode including four sixth sensing patterns disposed in the second ring region. The third sensing pattern, the fifth sensing pattern, the sixth sensing pattern, the fourth sensing pattern, the sixth sensing pattern, and the fifth sensing pattern may be arranged repeatedly twice in the second ring region in a clockwise direction.

In an embodiment, the electronic device may further include a third sensing routing line electrically connected to one of the two third sensing patterns, a third opposite sensing routing line electrically connected to the other of the two third sensing patterns, a fourth sensing routing line electrically connected to one of the two fourth sensing patterns, a fourth opposite sensing routing line electrically connected to the other of the two fourth sensing patterns, a fifth sensing routing line electrically connected to two ones of the four fifth sensing patterns, which face each other with the one of the two third sensing patterns interposed therebetween, a fifth opposite sensing routing line electrically connected to the other two ones of the four fifth sensing patterns, which face each other with the other of the two third sensing patterns interposed therebetween, a sixth sensing routing line electrically connected to two ones of the four sixth sensing patterns, which face each other with one of the two fourth sensing patterns interposed therebetween, and a sixth opposite sensing routing line electrically connected to the other two ones of the four sixth sensing patterns, which face each other with the other of the two fourth sensing patterns interposed therebetween.

In an embodiment, in the active region, the third sensing routing line, the third opposite sensing routing line, the fourth sensing routing line, and the fourth opposite sensing routing line may be provided to have a rotational symmetry. In the active region, the fifth sensing routing line, the fifth opposite sensing routing line, the sixth sensing routing line, and the sixth opposite sensing routing line may be provided to have a rotational symmetry.

In an embodiment, the first to fourth quadrants may have borders that are defined by first to fourth boundaries. Two lines of the third sensing routing line, the third opposite sensing routing line, the fourth sensing routing line, the fourth opposite sensing routing line, the fifth sensing routing line, the fifth opposite sensing routing line, the sixth sensing routing line, and the sixth opposite sensing routing line may be extended from the active region to the peripheral region enclosing the active region, at the first boundary. Other two lines may be extended from the active region to the peripheral region at the second boundary. Still other two lines may be extended from the active region to the peripheral region at the third boundary, and the remaining two lines may be extended from the active region to the peripheral region at the fourth boundary.

In an embodiment, the electronic device may further include an electrically-floated pattern. The electrically-floated pattern may be disposed in a region, which is enclosed by one of the plurality of first patterns and the plurality of second patterns.

According to an embodiment of the inventive concept, an electronic device may include a first electrode disposed in a first quadrant of an active region, a second electrode disposed in a second quadrant of the active region, a third electrode disposed in a third quadrant of the active region, a fourth electrode disposed in a fourth quadrant of the active region, a center electrode disposed in a center of the active region, a plurality of sensing patterns disposed in a ring region of the active region enclosing the center electrode and spaced apart from the center electrode, and a plurality of routing lines electrically connected to the plurality of sensing patterns. The plurality of routing lines may be arranged in each of regions, which are divided by a first cross line, which passes through the center and is extended in a first cross direction, and a second cross line, which is extended in a second cross direction perpendicular to the first cross direction, under a same rule.

In an embodiment, each of the regions may include two portions, which are respectively included in two quadrants of the first to fourth quadrants.

In an embodiment, the electronic device may further include an electrically-floated pattern. The first electrode may include a plurality of first patterns arranged in a direction away from the center of the active region. The electrically-floated pattern may be defined by a cutting pattern, which is provided in at least one of the plurality of first patterns.

According to an embodiment of the inventive concept, an electronic device may include a first transmission electrode disposed in a first quadrant of an active region, a second transmission electrode disposed in a second quadrant of the active region, a third transmission electrode disposed in a third quadrant of the active region, a fourth transmission electrode disposed in a fourth quadrant of the active region, a plurality of first reception patterns disposed in a first ring region of the active region enclosing a center of the active region, and a plurality of second reception patterns disposed in a second ring region of the active region enclosing the first ring region of the active region. Each of the first to fourth transmission electrodes may include a plurality of patterns, which are arranged in a direction away from the center of the active region, and a connection portion, which is extended from the plurality of patterns to electrically connect the plurality of patterns to each other. An extension direction of the connection portion may cross reference lines defining the first to fourth quadrants.

In an embodiment, a size of one of the plurality of second reception patterns, which is overlapped with one of the reference lines, may be different from a size of another of the plurality of second reception patterns, which is adjacent to the one of the second reception patterns.

In an embodiment, number of the plurality of second reception patterns may be greater than number of the plurality of first reception patterns.

In an embodiment, the electronic device may further include a center electrode disposed in the center of the active region and a center routing line electrically connected to the center electrode. In the active region, a first portion of the center routing line may be disposed in the first quadrant, a second portion of the center routing line may be disposed in the second quadrant, and a length of the first portion of the center routing line may be longer than a length of the second portion of the center routing line.

In an embodiment, the electronic device may further include a plurality of first reception routing lines, which are electrically connected to the plurality of first reception patterns. In the active region, a portion of a first line, which is one of the plurality of first reception routing lines, may be disposed in the second quadrant, a portion of a second line, which is another of the plurality of first reception routing lines, may be disposed in the third quadrant, and a portion of a third line, which is other of the plurality of first reception routing lines, may be disposed in the fourth quadrant. The portion of the first line, the portion of the second line, and the portion of the third line may be provided to have a rotational symmetry.

In an embodiment, the electronic device may further include a plurality of second reception routing lines, which are electrically connected to the plurality of second reception patterns. A portion of the plurality of second reception routing lines overlapped with the first quadrant, another portion of the plurality of second reception routing lines overlapped with the second quadrant, other portion of the plurality of second reception routing lines overlapped with the third quadrant, and a still other portion of the plurality of second reception routing lines overlapped with the fourth quadrant may be provided to have a rotational symmetry.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

Example embodiments will be more clearly understood from the following brief description taken in conjunction with the accompanying drawings. The accompanying drawings represent non-limiting, example embodiments as described herein.

Figure 1:
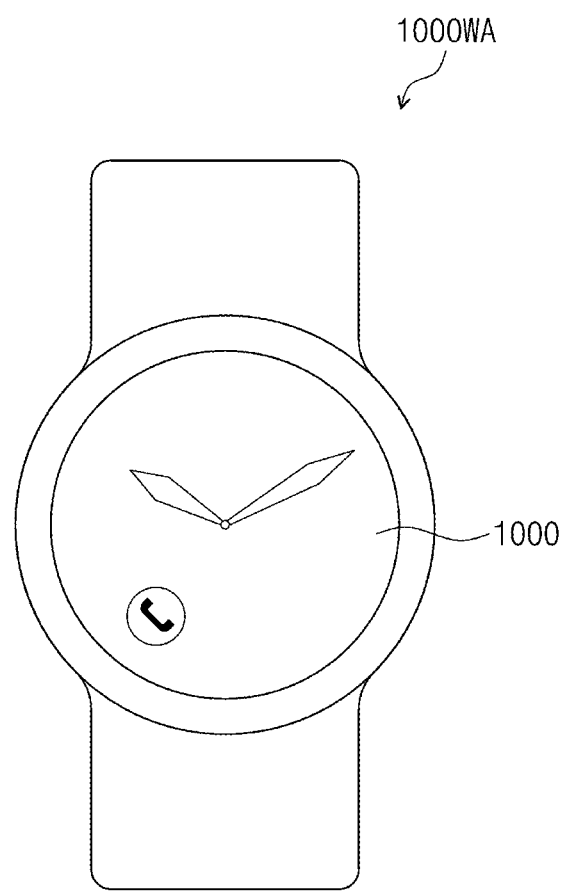
FIG. 1 is a diagram illustrating an example of an electronic device according to an embodiment of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the DR1-axis, the DR2-axis, and the DR3-axis are not limited to three axes of a rectangular coordinate system, such as the x, y, and z-axes, and may be interpreted in a broader sense. Additional axes DR1c, DR2c, DR3c, and DR4c are provided for additional explanation of embodiments described herein. For example, the DR1-axis, the DR2-axis, and the DR3-axis may be perpendicular to one another, or may represent different directions that are not perpendicular to one another. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a diagram illustrating an example of an electronic device according to an embodiment of the inventive concept.

Referring to FIG. 1, an electronic device 1000 may be used as a wearable device 1000WA or a part thereof.

The electronic device 1000 may display information on time or weather or icons, which allow a user to execute various applications or operations. The electronic device 1000 may be controlled by a touch event produced by a user. The electronic device 1000 may have a circular shape, but are not limited thereto. The electronic device may take a shape of a square, rectangle, or other polygon.

Figure 2:
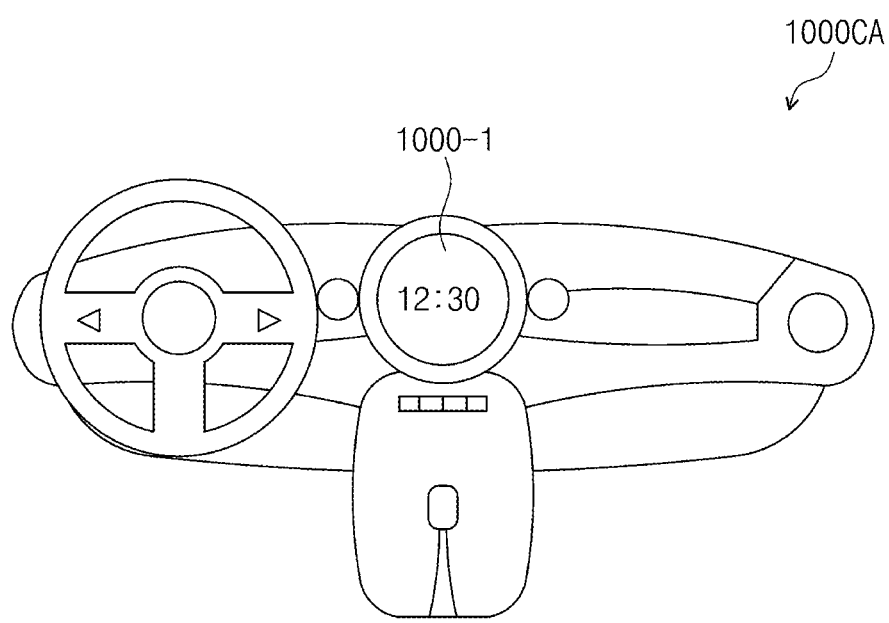
FIG. 2 is a diagram illustrating an example of an electronic device according to an embodiment of the inventive concept.
Figure 2:
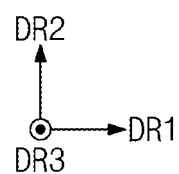

FIG. 2 is a diagram illustrating an example of an electronic device according to an embodiment of the inventive concept.

Referring to FIG. 2, an electronic device 1000-1 may be used as a part of a car 1000CA such as on a console or dashboard thereof, but embodiments are not limited thereto. The electronic device 1000-1 may be located on other parts of a car that are visible to a driver or passengers such as on a car door, on the back of seats, between seats, and other places readily viewable.

The electronic device 1000-1 may display an image and may sense an external input provided from the outside thereof. For example, the electronic device 1000-1 may display some pieces of information used for car driving (e.g., navigation information) or icons, which are used to control an air conditioning system, a heater, an audio system, and an air ventilation system, or an image obtained by a rear view camera. The electronic device 1000-1 may be controlled by a touch event made by a user.

FIGS. 1 and 2 illustrate two examples of the electronic devices 1000 and 1000-1, to which the inventive concept is applied, but the inventive concept is not limited to these examples.

Figure 3:
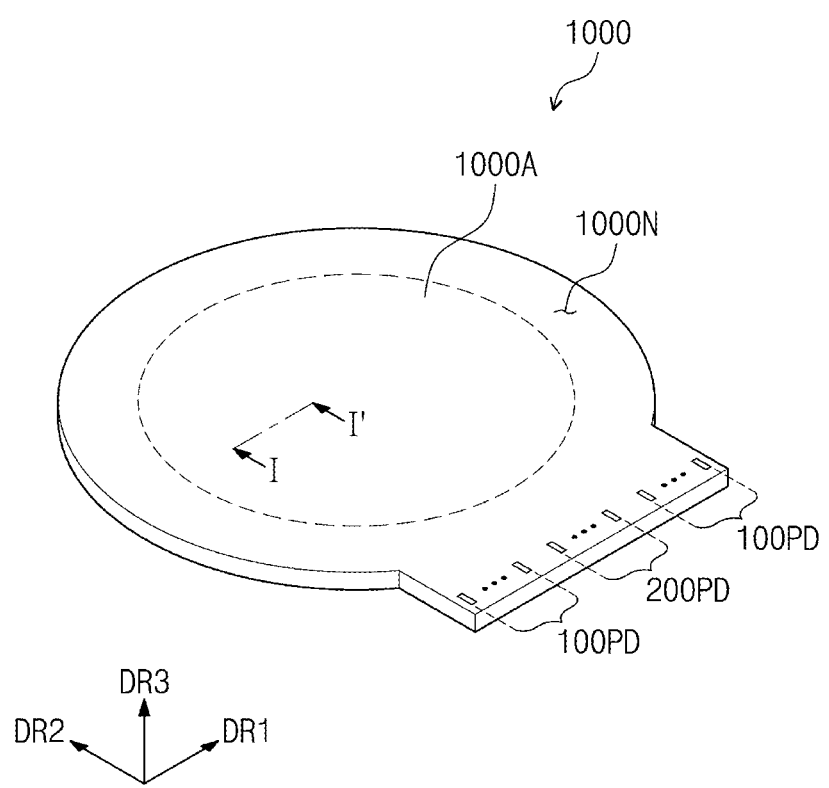
FIG. 3 is a perspective view illustrating an electronic device according to an embodiment of the inventive concept.
Figure 4:
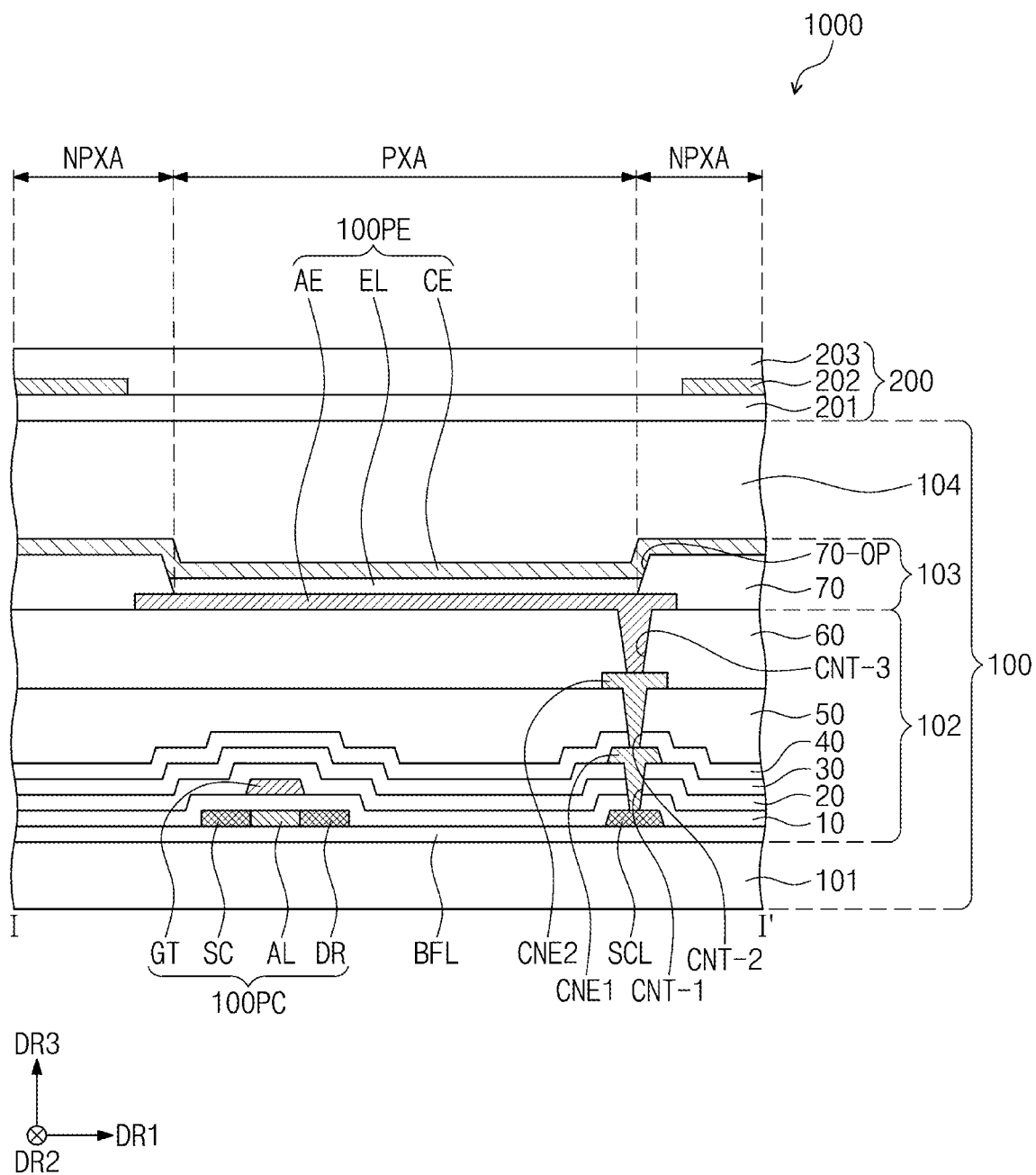
FIG. 4 is a sectional view taken along a line I-I' of FIG. 3.

FIG. 3 is a perspective view illustrating an electronic device according to an embodiment of the inventive concept. FIG. 4 is a sectional view taken along a line I-I' of FIG. 3.

Referring to FIG. 3, an active region 1000A and a peripheral region 1000N may be defined in the electronic device 1000. The peripheral region 1000N may be provided near the active region 1000A to enclose the active region 1000A.

The electronic device 1000 may display an image on the active region 1000A and may sense an input provided from the outside of the electronic device 1000. The active region 1000A may include a flat surface defined by a first direction DR1 and a second direction DR2, but the inventive concept is not limited to this example. For example, the active region 1000A may include a curved surface or may include both flat and curved surfaces. In the present specification, a third direction DR3, which is not parallel to the first and second directions DR1 and DR2, may be referred to as a thickness direction of the electronic device 1000.

Referring to FIGS. 3 and 4, the electronic device 1000 may include a display layer 100 and a sensor layer 200. The electronic device 1000 may include display pads 100PD, which are electrically connected to the display layer 100, and sensor pads 200PD (hereinafter, refer to pads), which are electrically connected to the sensor layer 200. A single printed circuit film may be attached to the display pads 100PD and the sensor pads 200PD, but the inventive concept is not limited to this example. For example, a first printed circuit film may be attached to the display pads 100PD, and a second printed circuit film may be attached to the sensor pads 200PD.

The display layer 100 may be an element, which is used to substantially produce an image. The display layer 100 may be a light-emitting type display layer (e.g., an organic light emitting display layer, a quantum dot display layer, a micro-LED display layer, or a nano-LED display layer). The description that follows will refer to an example in which the display layer 100 is the organic light emitting display layer, but the inventive concept is not limited to this example.

The sensor layer 200 may be disposed on the display layer 100. The sensor layer 200 may sense an external input provided from the outside. An example of the external input is an input provided from a user. The user's input may include various types of external inputs, such as a portion of the user's body, a pen, light, heat, or pressure.

The sensor layer 200 may be formed on the display layer 100 in a successive manner. In this case, it may be expressed that the sensor layer 200 is directly disposed on the display layer 100. In the present specification, this expression refers to that another element or layer is not disposed between the sensor layer 200 and the display layer 100. In other words, an additional adhesive layer may not be disposed between the sensor layer 200 and the display layer 100.

The display layer 100 may include a base layer 101, a circuit layer 102, a light-emitting element layer 103, and an encapsulation layer 104.

The base layer 101 may be an element providing a base surface, on which the circuit layer 102 will be disposed. The base layer 101 may be a glass substrate, a metal substrate, or a polymer substrate. However, the inventive concept is not limited to this example, and in an embodiment, the base layer 101 may be an inorganic layer, an organic layer, or a composite layer.

The base layer 101 may have a multi-layered structure. For example, the base layer 101 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may be formed of or include at least one of polyimide-based resins. In addition, each of the first and second synthetic resin layers may include at least one of acrylate-based resins, methacrylate-based resins, polyisoprene-based resins, vinyl-based resins, epoxy-based resins, urethane-based resins, cellulose-based resins, siloxane-based resins, polyamide-based resins, or perylene-based resins. In the present specification, the expression "X-based resins" are used to refer to that such materials include functional groups of the material "X".

The circuit layer 102 may be disposed on the base layer 101. The circuit layer 102 may include an insulating layer, a semiconductor pattern, a conductive pattern, a signal line, or the like. The formation of the circuit layer 102 may include forming an insulating layer, a semiconductor layer, and a conductive layer on the base layer 101 using a coating or deposition method and then performing a photolithography process several times to selectively pattern the insulating layer, the semiconductor layer, and the conductive layer. As a result of the patterning, the semiconductor pattern, the conductive pattern, and the signal line of the circuit layer 102 may be formed.

At least one inorganic layer may be formed on a top surface of the base layer 101. The inorganic layer may be formed of or include at least one of aluminum oxide, titanium oxide, silicon oxide, silicon nitride, silicon oxynitride, zirconium oxide, or hafnium oxide. For example, the at least one inorganic layer may include a plurality of inorganic layers of a multi-layered structure. The multi-layered inorganic layers may be used as a barrier layer and/or a buffer layer. In the present embodiment, the display layer 100 is illustrated to include a buffer layer BFL.

The buffer layer BFL may improve a bonding strength between the base layer 101 and the semiconductor pattern. The buffer layer BFL may be formed of or include at least one of silicon oxide, silicon nitride, or silicon oxynitride. For example, the buffer layer BFL may have a multi-layered structure, in which at least one silicon oxide layer and at least one silicon nitride layer are alternately stacked.

The semiconductor pattern may be disposed on the buffer layer BFL. The semiconductor pattern may be formed of or include polysilicon. But the inventive concept is not limited to this example, and the semiconductor pattern may be formed of or include at least one of amorphous silicon, low-temperature poly silicon, or oxide semiconductor materials.

FIG. 4 illustrates a portion of the semiconductor pattern, but the semiconductor pattern may include another portion disposed in other regions. In an embodiment, the semiconductor patterns may be arranged with a certain rules throughout the pixels. Electrical characteristics of the semiconductor pattern may vary depending on its doping state. The semiconductor pattern may include a first region with high conductivity and a second region with low conductivity. The first region may be doped with n-type or p-type dopants. A p-type transistor may include regions doped with p-type dopants, and an n-type transistor may include regions doped with n-type dopants. The second region may be an undoped region or a region, which is doped to have a lower concentration than that of the first region.

The first region may have higher conductivity than that of the second region and may be substantially used as an electrode or a signal line. The second region may substantially correspond to an active or channel region of a transistor. In other words, a portion of the semiconductor pattern may be used as the active region or channel region of the transistor, another portion may be used as the source or drain electrode of the transistor, and other region may be used as a connection electrode or a connection signal line.

Each of the pixels may be configured to have a circuit structure including seven transistors, one capacitor, and a light-emitting element for light-emitting light, but the circuit structure of the pixel may be variously changed. FIG. 4 illustrates an example of the pixel, in which a transistor 100PC and a light-emitting element 100PE are included.

A source SC, an active region AL, and a drain DR of the transistor 100PC may be parts of the semiconductor pattern. The source SC and the drain DR may be extended in opposite directions from the active region AL, when viewed in a sectional view. FIG. 4 illustrates a portion of a connection signal line SCL, which is formed from the semiconductor pattern. Although not illustrated, the connection signal line SCL may be connected to the drain DR of the transistor 100PC, when viewed in a plan view.

A first insulating layer 10 may be disposed on the buffer layer BFL. The first insulating layer 10 may be overlapped with a plurality of pixels in common to cover the semiconductor pattern. The first insulating layer 10 may be an inorganic layer and/or an organic layer and may have a single- or multi-layered structure. The first insulating layer 10 may be formed of or include at least one of aluminum oxide, titanium oxide, silicon oxide, silicon nitride, silicon oxynitride, zirconium oxide, or hafnium oxide. In the present embodiment, the first insulating layer 10 may be a single layer formed of silicon oxide. The first insulating layer 10 as well as an insulating layer of the circuit layer 102 to be described below may be an inorganic layer and/or an organic layer and may have a single- or multi-layered structure. The inorganic layer may be formed of or include at least one of the afore-described material, but the inventive concept not limited to this example.

A gate GT of the transistor 100PC may be disposed on the first insulating layer 10. The gate GT may be a portion of a metal pattern. The gate GT may be overlapped with the active region AL. In an embodiment, the gate GT may be used as a mask in a process of doping the semiconductor pattern.

A second insulating layer 20 may be disposed on the first insulating layer 10 to cover the gate GT. The second insulating layer 20 may be overlapped in common with the pixels. The second insulating layer 20 may be an inorganic layer and/or an organic layer and may have a single- or multi-layered structure. The second insulating layer 20 may be formed of or include at least one of silicon oxide, silicon nitride, or silicon oxynitride. In the present embodiment, the second insulating layer 20 may have a multi-layered structure including a silicon oxide layer and a silicon nitride layer.

A third insulating layer 30 may be disposed on the second insulating layer 20. The third insulating layer 30 may have a single- or multi-layered structure. For example, the third insulating layer 30 may have a multi-layered structure including a silicon oxide layer and a silicon nitride layer.

A first connection electrode CNE1 may be disposed on the third insulating layer 30. The first connection electrode CNE1 may be coupled to the connection signal line SCL through a contact hole CNT-1, which is formed to penetrate the first, second, and third insulating layer 10, 20, 30.

A fourth insulating layer 40 may be disposed on the third insulating layer 30. The fourth insulating layer 40 may be a single layer formed of silicon oxide. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be coupled to the first connection electrode CNE1 through a contact hole CNT-2, which is formed to penetrate the fourth insulating layer 40 and the fifth insulating layer 50.

A sixth insulating layer 60 may be disposed on the fifth insulating layer 50 to cover the second connection electrode CNE2. The sixth insulating layer 60 may be an organic layer.

The light-emitting element layer 103 may be disposed on the circuit layer 102. The light-emitting element layer 103 may include a light-emitting element 100PE. For example, the light-emitting element layer 103 may be formed of or include an organic light emitting material, quantum dots, quantum rods, micro-LEDs, or nano-LEDs. The description that follows will refer to an example, in which the light-emitting element 100PE is an organic light emitting element, but the inventive concept is not limited to this example.

The light-emitting element 100PE may include a first electrode AE, an emission layer EL, and a second electrode CE.

The first electrode AE may be disposed on the sixth insulating layer 60. The first electrode AE may be coupled to the second connection electrode CNE2 through a contact hole CNT-3 penetrating the sixth insulating layer 60.

A pixel definition layer 70 may be disposed on the sixth insulating layer 60 to cover a portion of the first electrode AE. An opening 70-OP may be defined in the pixel definition layer 70. The opening 70-OP of the pixel definition layer 70 may expose at least a portion of the first electrode AE.

The active region 1000A (e.g., see FIG. 3) may include a light-emitting region PXA and a non-light-emitting region NPXA adjacent to the light-emitting region PXA. The non-light-emitting region NPXA may enclose the light-emitting region PXA. In the present embodiment, the light-emitting region PXA may be defined to correspond to a region of the first electrode AE exposed through the opening 70-OP.

The emission layer EL may be disposed on the first electrode AE. The emission layer EL may be disposed in a region corresponding to the opening 70-OP. In other words, the emission layer EL may be formed to include a plurality of portions, which are respectively or separately disposed in the pixels. In the case where the emission layer EL includes the portions, which are respectively and separately disposed in the pixels, each portion of the emission layer EL may emit one of blue, red, and green lights. However, the inventive concept is not limited to this example, and in an embodiment, the emission layer EL may be provided in two or more pixels in common. In this case, the emission layer EL may be configured to emit a blue or white light.

The second electrode CE may be disposed on the emission layer EL. The second electrode CE may be a single pattern that is disposed in common throughout a plurality of pixels.

Although not illustrated, a hole control layer may be disposed between the first electrode AE and the emission layer EL. The hole control layer may be disposed in common in the light-emitting region PXA and the non-light-emitting region NPXA. The hole control layer may include a hole transport layer and, in an embodiment, may further include a hole injection layer. An electron control layer may be disposed between the emission layer EL and the second electrode CE. The electron control layer may include an electron transport layer and, in an embodiment, may further include an electron injection layer. The hole control layer and the electron control layer may be formed in common on a plurality of pixels, using an open mask.

The encapsulation layer 104 may be disposed on the light-emitting element layer 103. The encapsulation layer 104 may include an inorganic layer, an organic layer, and an inorganic layer, which are sequentially stacked, but the structure of the encapsulation layer 104 is not limited to this example.

The inorganic layer may protect the light-emitting element layer 103 from moisture or oxygen, and the organic layer may protect the light-emitting element layer 103 from foreign substances (e.g., dust particles). The inorganic layers may include a silicon nitride layer, a silicon oxynitride layer, a silicon oxide layer, a titanium oxide layer, an aluminum oxide layer, or the like. The organic layer may include an acrylic organic layer, but the inventive concept is not limited thereto.

The sensor layer 200 may include a base layer 201, a conductive layer 202, and a cover insulating layer 203.

The base layer 201 may be an inorganic layer that is formed of or includes at least one of silicon nitride, silicon oxynitride, or silicon oxide. Alternatively, the base layer 201 may be an organic layer, which is formed of or include at least one of epoxy-based resins, acrylate-based resins, or imide-based resins. The base layer 201 may have a single-layered structure or a multi-layered structure including a plurality of layers, which are stacked in a third direction DR3.

The conductive layer 202 may have a single-layered structure or a multi-layered structure including a plurality of layers, which are stacked in a third direction DR3.

The conductive layer 202 of the single-layered structure may be formed of or include a metal layer or a transparent conductive layer. The metal layer may be formed of or include at least one of molybdenum, silver, titanium, copper, aluminum, or alloys thereof. The transparent conductive layer may include transparent conductive oxide, such as indium tin oxide (ITO), indium zinc oxide (IZO), zinc oxide (ZnO), or indium tin zinc oxide (ITZO). In certain embodiments, the transparent conductive layer may include a conductive polymer (e.g., PEDOT), metal nanowires, or graphene.

The conductive layer 202 of the multi-layered structure may include a plurality of metal layers. For example, such metal layers constituting the conductive layer 202 may have a triple-layered structure including, for example, titanium/aluminum/titanium layers. The conductive layer 202 of the multi-layered structure may include at least one metal layer and at least one transparent conductive layer.

The cover insulating layer 203 may include an inorganic layer. The inorganic layer may be formed of or include at least one of aluminum oxide, titanium oxide, silicon oxide, silicon nitride, silicon oxynitride, zirconium oxide, or hafnium oxide.

Alternatively, the cover insulating layer 203 may include an organic layer. The organic layer may be formed of or include at least one of acrylate-based resins, methacrylate-based resins, polyisoprene-based resins, vinyl-based resins, epoxy-based resins, urethane-based resins, cellulose-based resins, siloxane-based resins, polyimide resins, polyamide-based resins, or perylene-based resins FIG. 5 is a plan view illustrating a sensor layer according to an embodiment of the inventive concept.

Figure 5:
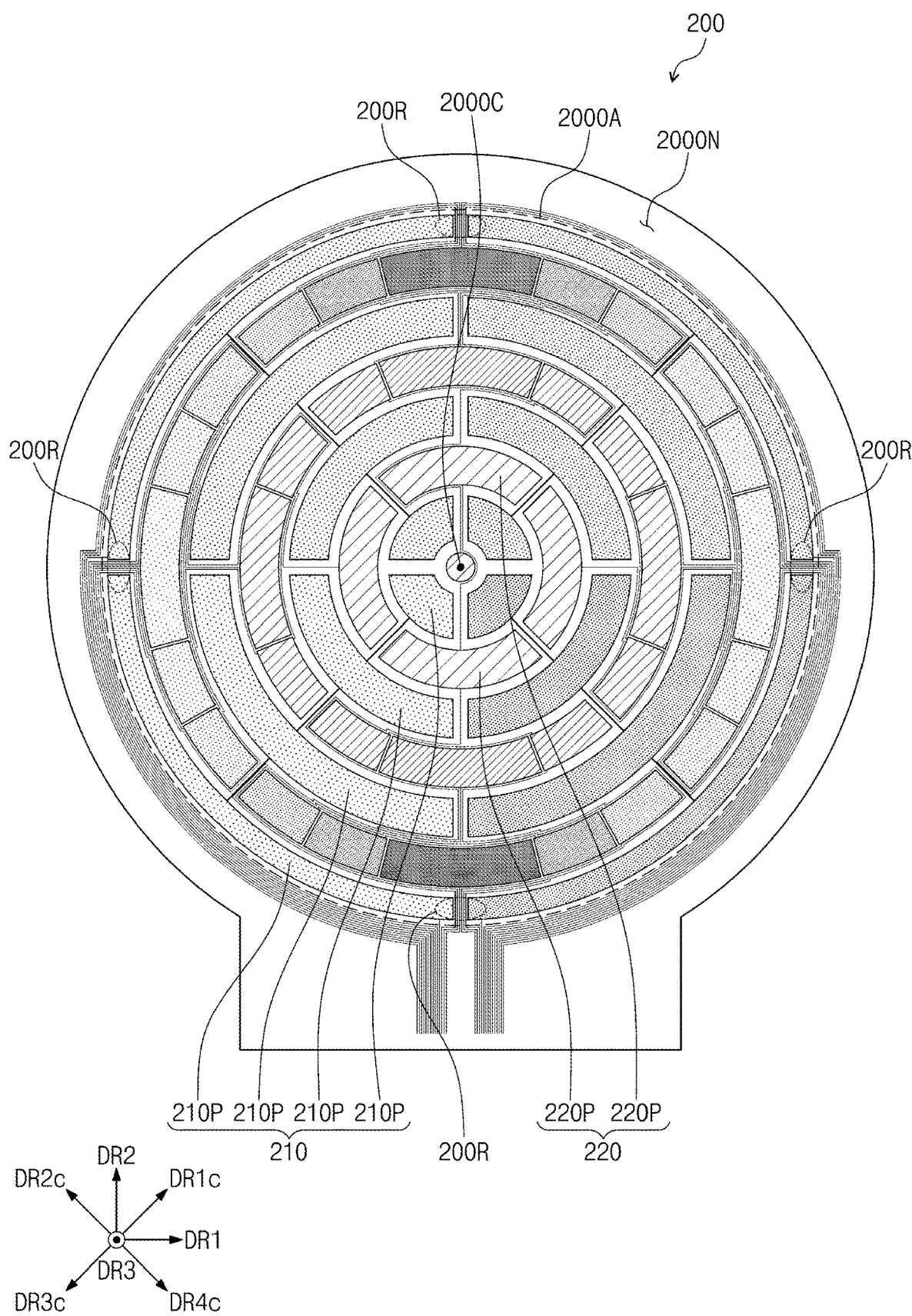
FIG. 5 is a plan view illustrating a sensor layer according to an embodiment of the inventive concept.

Referring to FIG. 5, an active region 2000A and a peripheral region 2000N may be defined in the sensor layer 200. The peripheral region 2000N may be provided to enclose the active region 2000A. The active region 2000A may correspond to the active region 1000A of (e.g., see FIG. 3) the electronic device 1000 (e.g., see FIG. 3), and the peripheral region 2000N may correspond to the peripheral region 1000N (e.g., see FIG. 3) of the electronic device 1000 (e.g., see FIG. 3).

The sensor layer 200 may include a plurality of electrodes 210 and a plurality of sensing electrodes 220. Each of the electrodes 210 and the sensing electrodes 220 may be disposed in the active region 2000A. The electronic device 1000 (e.g., see FIG. 1) may sense a change in capacitance between the electrodes 210 and the sensing electrodes 220, which is caused by an external input and, thereby, may sense the external input.

In an embodiment, a driving or transmit (hereinafter, refer to TX) signal may be provided to each of the electrodes 210. The electrodes 210 may be referred to as transmission or TX electrodes. Each of the sensing electrodes 220 may provide an analog signal, which is called the receive (hereinafter, refer to RX) signal, to a sensor driving part. The sensing electrodes 220 may be referred to as reception or RX electrodes, but embodiments are not limited thereto. In an embodiment, the electrodes 210 may be used as the reception electrodes, and the sensing electrodes 220 may be used as the transmission electrodes.

In the present specification, the electrodes 210 and the sensing electrodes 220 are used to differentiate two elements, but the use of these terms does not always mean that the electrodes 210 serve as only the transmission electrodes and the sensing electrodes 220 serve as the reception electrodes. The sensing electrodes 220 may be referred to as opposite electrodes or mutual electrodes.

Each of the electrodes 210 may include a plurality of patterns 210P, which are arranged in a direction away from a center 2000C of the active region 2000A. Each of the sensing electrodes 220 may include a plurality of sensing patterns 220P, which are spaced apart from the center 2000C by a same distance. This will be described in more detail herein.

Each of the patterns 210P and the sensing patterns 220P may have a mesh structure. In this case, at least one opening may be defined in each of the patterns 210P and the sensing patterns 220P. However, the inventive concept is not limited to this example, and in an embodiment, each of the patterns 210P and the sensing patterns 220P may be composed of a transparent single electrode.

Figure 6:
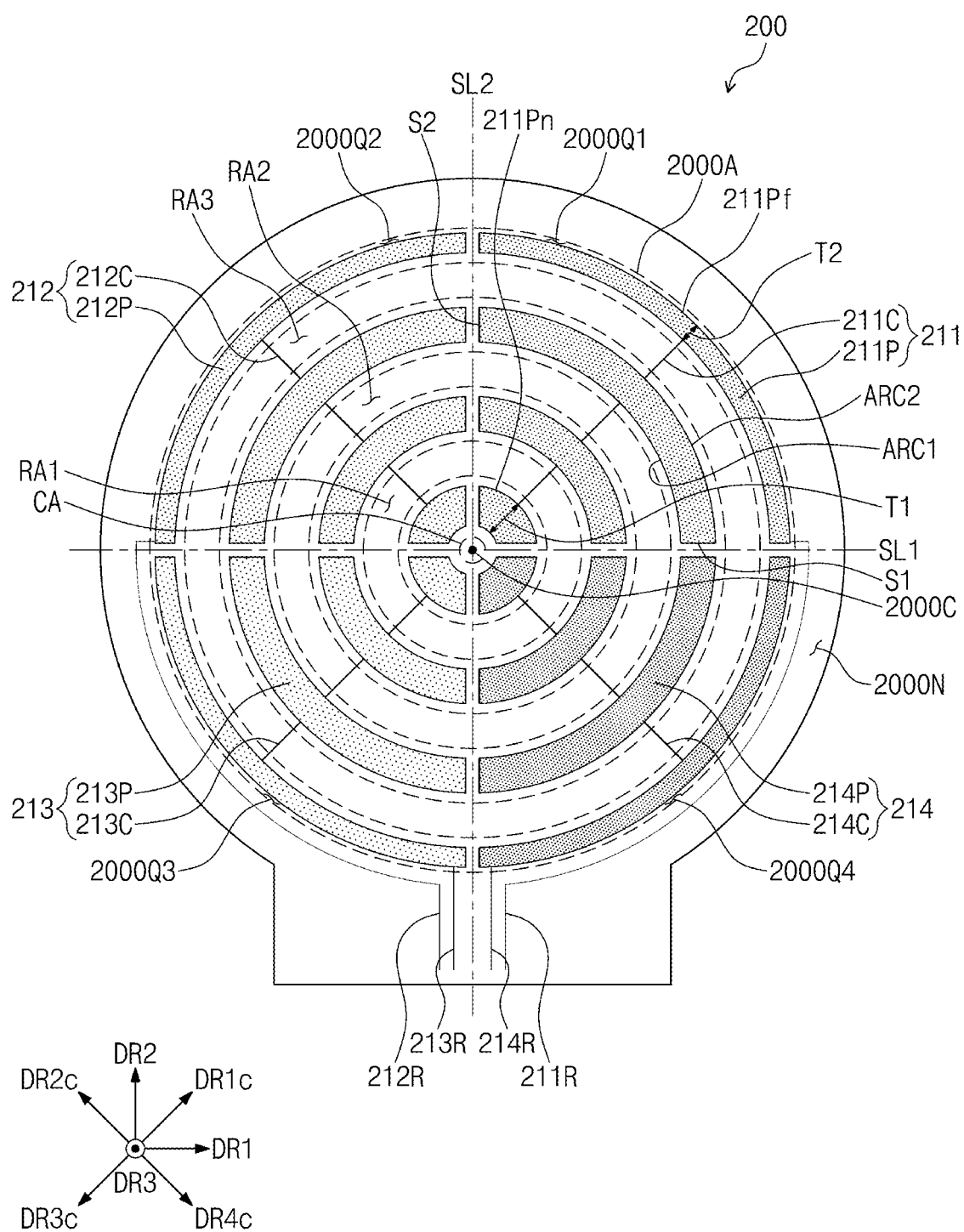
FIG. 6 is a plan view illustrating some elements constituting a sensor layer according to an embodiment of the inventive concept.

FIG. 6 is a plan view illustrating some elements constituting the sensor layer 200 according to an embodiment of the inventive concept.

Referring to FIG. 6, the active region 2000A may be divided into four quadrants. For example, a first quadrant 2000Q1, a second quadrant 2000Q2, a third quadrant 2000Q3, and a fourth quadrant 2000Q4 may be defined in the counter-clockwise direction, based on a first reference line SL1 and a second reference line SL2 extending in the first and second directions DR1 and DR2, respectively. The first and second reference lines SL1 and SL2 may cross each other at the center 2000C.

The electrodes 210 (e.g., see FIG. 5) may include a first electrode 211 disposed in the first quadrant 2000Q1, a second electrode 212 disposed in the second quadrant 2000Q2, a third electrode 213 disposed in the third quadrant 2000Q3, and a fourth electrode 214 disposed in the fourth quadrant 2000Q4. The first to fourth electrodes 211, 212, 213, and 214 may be referred to as first to fourth transmission electrodes 211, 212, 213, and 214.

The first electrode 211 may include first patterns 211P, which are arranged in a direction away from the center 2000C or a center region CA of the active region 2000A, and first connection portions 211C, which connect the first patterns 211P. Each of the arced patterns in the quadrants may represent a pattern. The first patterns 211P may be arranged to be spaced apart from each other in a first cross direction DR1c, and the first connection portions 211C may be extended in the first cross direction DR1c to connect the first patterns 211P. The first cross direction DR1c may cross extension directions of the first and second reference lines SL1 and SL2.

The second electrode 212 may include second patterns 212P, which are arranged in a second cross direction DR2c away from the center 2000C or a center region CA of the active region 2000A, and second connection portions 212C, which are extended in the second cross direction DR2c to connect the second patterns 212P.

The third electrode 213 may include third patterns 213P, which are arranged in a third cross direction DR3c away from the center 2000C or a center region CA of the active region 2000A, and third connection portions 213C, which are extended in the third cross direction DR3c to connect the third patterns 213P.

The fourth electrode 214 may include fourth patterns 214P, which are arranged in a fourth cross direction DR4c away from the center 2000C or a center region CA of the active region 2000A, and fourth connection portions 214C, which are extended in the fourth cross direction DR4c to connect the fourth patterns 214P.

The first cross direction DR1c may be defined as a direction between the first direction DR1 and the second direction DR2. The second cross direction DR2c may be a direction that is orthogonal to the first cross direction DR1c. The third cross direction DR3c may be a direction, which is directly opposite to the first cross direction DR1c and is orthogonal to the second cross direction DR2c. The fourth cross direction DR4c may be a direction, which is directly opposite to the second cross direction DR2c and is orthogonal to the third cross direction DR3c. The first cross direction DR1c, the second direction DR2, the second cross direction DR2c, the third cross direction DR3c, and the fourth cross direction DR4c may be sequentially defined from the first direction DR1 in the counter-clockwise direction.

The sensor layer 200 may include a first routing line 211R electrically connected to the first electrode 211, a second routing line 212R electrically connected to the second electrode 212, a third routing line 213R electrically connected to the third electrode 213, and a fourth routing line 214R electrically connected to the fourth electrode 214. The first to fourth routing lines 211R, 212R, 213R, and 214R may be disposed in the peripheral region 2000N. The first to fourth routing lines 211R, 212R, 213R, and 214R may be electrically connected to corresponding pads of the pads 200PD (e.g., see FIG. 3), respectively.

The first routing line 211R and the second routing line 212R may be symmetric to each other about the second reference line SL2, by which the first quadrant 2000Q1 and the second quadrant 2000Q2 are divided. In an embodiment, the third routing line 213R and the fourth routing line 214R may also be symmetric to each other about the second reference line SL2.

Each of the first patterns 211P may have a shape that is defined by a first arc ARC1, a second arc ARC2 longer than the first arc ARC1, and first and second sides S1 and S2 connecting the first arc ARC1 to the second arc ARC2. Each of the second to fourth patterns 212P, 213P, and 214P may also have substantially the same shape as the first patterns 211P, and thus, a description thereof will be omitted.

An area of a first pattern 211Pn, which is one of the first patterns 211P and is most adjacent to the center region CA, may be smaller than an area of a first pattern 211Pf, which is another of the first patterns 211P and is farthest from the center region CA. Because the sizes of the first patterns 211P get larger as they fan out from the center region CA, each of lengths of the first and second arcs ARC1 and ARC2 of the first pattern 211Pn may be smaller than each of lengths of the first and second arcs ARC1 and ARC2 of the first pattern 211Pf.

A distance T1 between the first and second arcs ARC1 and ARC2 of the first pattern 211Pn may be larger than a distance T2 between the first and second arcs ARC1 and ARC2 of the first pattern 211Pf. However, the inventive concept is not limited to this example. In some example embodiments, T1 may be equal to T2, or T2 may be greater than T1.

A first ring region RA1, a second ring region RA2, and a third ring region RA3 may be defined in the active region 2000A. The first ring region RA1 may be provided to enclose the center region CA. The second ring region RA2 may be provided to enclose the first ring region RA1. The third ring region RA3 may be provided to enclose the second ring region RA2. The first to fourth patterns 211P, 212P, 213P, and 214P may not be disposed in the center region CA and the first to third ring regions RA1, RA2, and RA3.

The first patterns 211P may be spaced apart from each other by a specific distance, and the first to third ring regions RA1, RA2, and RA3 may be defined in regions between the first patterns 211P. Each of the first to fourth connection portions 211C, 212C, 213C, and 214C may be disposed in the first to third ring regions RA1, RA2, and RA3.

Figure 7:
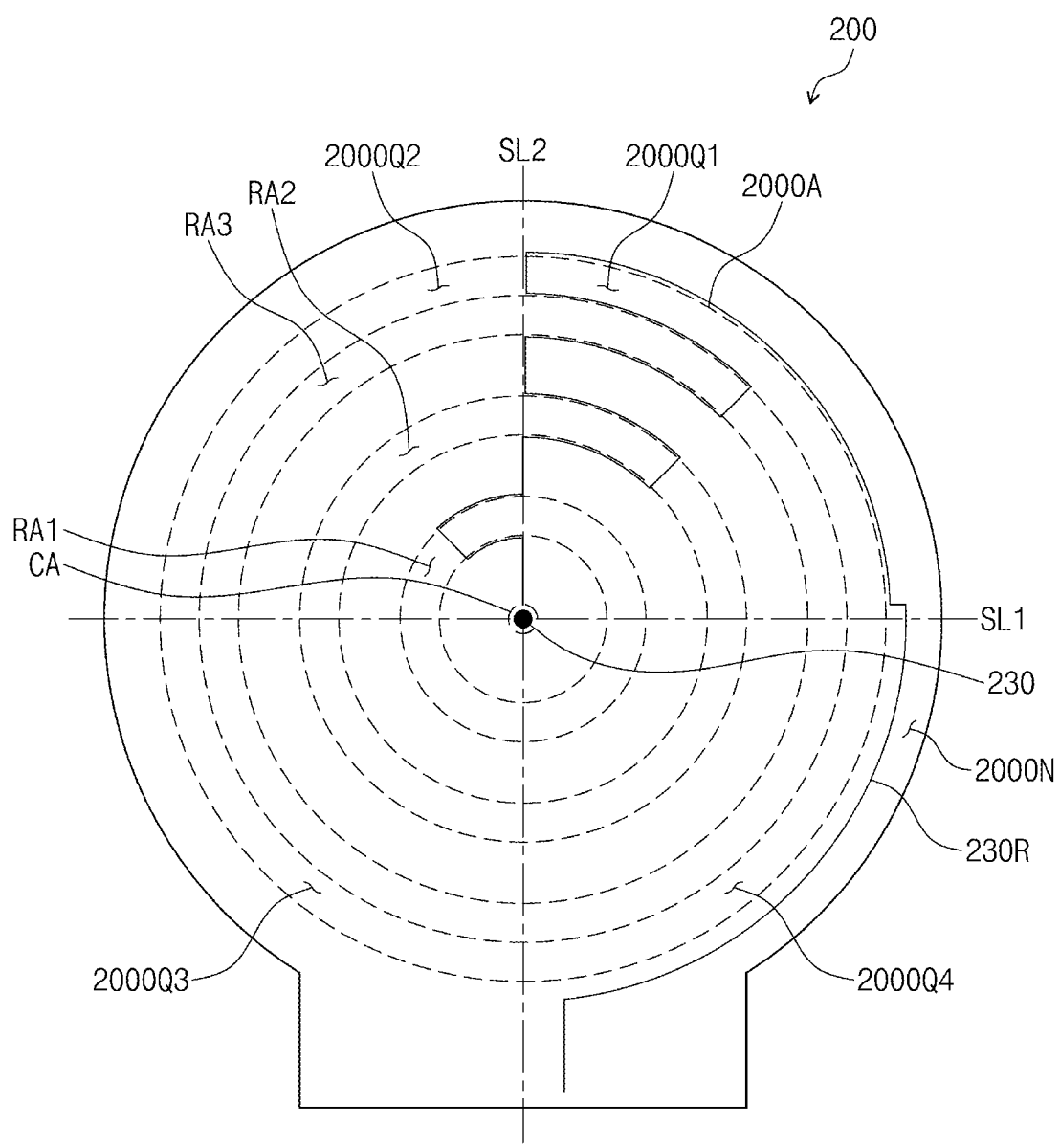
FIG. 7 is a plan view illustrating some elements constituting a sensor layer according to an embodiment of the inventive concept.

FIG. 7 is a plan view illustrating some elements constituting a sensor layer according to an embodiment of the inventive concept.

FIG. 7 illustrates a center electrode 230 and a center routing line 230R, which are included in the sensor layer 200.

Referring to FIGS. 6 and 7, the center electrode 230 may be disposed in the center region CA, and the center routing line 230R may be electrically connected to the center electrode 230. The center electrode 230 may have a shape corresponding to the center region CA. For example, the center electrode 230 may have a circular shape. In the embodiment of FIGS. 6 and 7, the center electrode 230 may be provided to face the first electrode 211, the second electrode 212, the third electrode 213, and the fourth electrode 214.

The center routing line 230R may be electrically connected to the center electrode 230. The sensor layer 200 may include a single conductive layer (e.g., the conductive layer 202 of FIG. 4). The center routing line 230R may be disposed on the same layer as the electrodes 210 (e.g., see FIG. 5) and the sensing electrodes 220 (e.g., see FIG. 5). Thus, the center routing line 230R may be disposed along a region, in which the electrodes 210 (e.g., see FIG. 5) and the sensing electrodes 220 (e.g., see FIG. 5) are not disposed. Accordingly, the center routing line 230R may have a serpentine shape, in the active region 2000A.

The center routing line 230R may be electrically connected to a corresponding pad of the pads 200PD (e.g., see FIG. 3) via some of the first to fourth quadrants 2000Q1, 2000Q2, 2000Q3, and 2000Q4 (e.g., the second and first quadrants 2000Q2 and 2000Q1) and the peripheral region 2000N. For example, the center routing line 230R may include a first portion and a second portion, which are respectively disposed in the first quadrant 2000Q1 and the second quadrant 2000Q2. The center routing line 230R may be mainly disposed to be overlapped with the first quadrant 2000Q1, and a length of the first portion may be larger than a length of the second portion. The serpentine shape of the center routing line 230R may be present more in the first quadrant 2000Q1 than present in the second quadrant 2000Q2, but embodiments are not limited to. Depending on the design, the serpentine shape of the center routing line 230R may be present more in a different quadrant than the first quadrant 2000Q1.

The center routing line 230R may be extended from the active region 2000A to the peripheral region 2000N, at a portion that is located near a boundary between the first and second quadrants 2000Q1 and 2000Q2.

Figure 8:
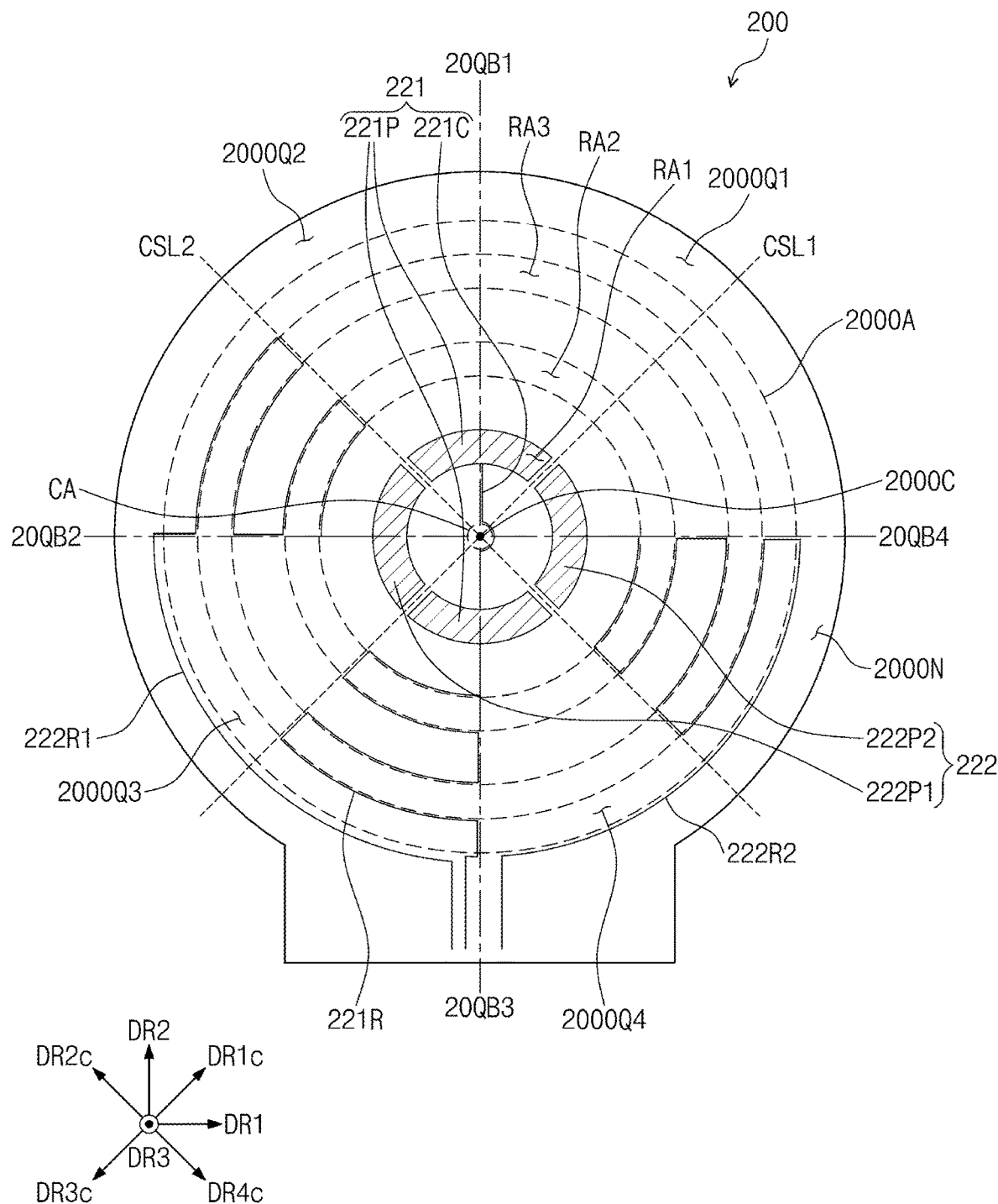
FIG. 8 is a plan view illustrating some elements constituting a sensor layer according to an embodiment of the inventive concept.

FIG. 8 is a plan view illustrating some elements constituting a sensor layer according to an embodiment of the inventive concept.

FIG. 8 illustrates a first sensing electrode 221, a second sensing electrode 222, a first sensing routing line 221R, a second sensing routing line 222R1, and a second opposite sensing routing line 222R2, which are disposed in the sensor layer 200. The first sensing electrode 221 and the second sensing electrode 222 may be elements constituting the sensing electrodes 220 (e.g., see FIG. 5).

The first sensing electrode 221 may include first sensing patterns 221P, which are spaced apart from the center 2000C of the active region 2000A by the same distance, and a first sensing connection line 221C, which connects the first sensing patterns 221P to each other. The first sensing patterns 221P may be spaced apart from each other in the second direction DR2 with the center region CA interposed therebetween. The first sensing connection line 221C may have a shape enclosing a portion of the center region CA. For example, a portion of the first sensing connection line 221C may have a semi-circular arc shape.

The second sensing electrode 222 may include second sensing patterns 222P1 and 222P2, which are spaced apart from the center 2000C of the active region 2000A by a same distance. The second sensing patterns 222P1 and 222P2 may be spaced apart from each other in the first direction DR1 with the center region CA interposed therebetween. All of the first sensing patterns 221P and the second sensing patterns 222P1 and 222P2 may be disposed in the first ring region RA1. The second sensing routing line 222R1 may be electrically connected to the second sensing pattern 222P1 of the second sensing patterns 222P1 and 222P2, and the second opposite sensing routing line 222R2 may be electrically connected to the other (i.e., the second sensing pattern 222P2) of the second sensing patterns 222P1 and 222P2. The second sensing routing line 222R1 and the second opposite sensing routing line 222R2 may be electrically connected to corresponding pads of the pads 200PD (e.g., see FIG. 3), respectively. The second sensing patterns 222P1 and 222P2 may correspond to the same channel.

In the active region 2000A, the first sensing routing line 221R may be disposed in the third quadrant 2000Q3, the second sensing routing line 222R1 may be disposed in the second quadrant 2000Q2, and the second opposite sensing routing line 222R2 may be disposed in the fourth quadrant 2000Q4. In other words, a portion of the first sensing routing line 221R overlapped with the active region 2000A may be disposed in the third quadrant 2000Q3, a portion of the second sensing routing line 222R1 overlapped with the active region 2000A may be disposed in the second quadrant 2000Q2, and a portion of the second opposite sensing routing line 222R2 overlapped with the active region 2000A may be disposed in the fourth quadrant 2000Q4.

In the active region 2000A, the first sensing routing line 221R, the second sensing routing line 222R1, and the second opposite sensing routing line 222R2 may be provided to have a rotational symmetry. For example, a portion of the first sensing routing line 221R, a portion of the second sensing routing line 222R1, and a portion of the second opposite sensing routing line 222R2 disposed in the active region 2000A may have substantially the same shape, and be positioned at same intervals about the active region 2000A.

The first sensing routing line 221R, the second sensing routing line 222R1, and the second opposite sensing routing line 222R2 may be disposed on the same layer as the electrodes 210 (e.g., see FIG. 5) and the sensing electrodes 220 (e.g., see FIG. 5). Thus, the first sensing routing line 221R, the second sensing routing line 222R1, and the second opposite sensing routing line 222R2 may be extended along a region, in which the electrodes 210 (e.g., see FIG. 5) and the sensing electrodes 220 (e.g., see FIG. 5) are not disposed. Accordingly, the first sensing routing line 221R, the second sensing routing line 222R1, and the second opposite sensing routing line 222R2 may have a serpentine shape, in the active region 2000A.

The first sensing routing line 221R, the second sensing routing line 222R1, and the second opposite sensing routing line 222R2 may be arranged in at least a portion of each of regions divided by first and second cross lines CSL1 and CSL2 extending in the first and second cross directions DR1c and DR2c, respectively, under the same rule.

Each of the regions, which are divided by the first and second cross lines CSL1 and CSL2, may include two portions, which are respectively included in two quadrants of the first to fourth quadrants 2000Q1, 2000Q2, 2000Q3, and 2000Q4. For example, the first one of the regions may include a half portion of the first quadrant 2000Q1 and a half portion of the second quadrant 2000Q2, the second one of the regions may include the remaining half portion of the second quadrant 2000Q2 and a half portion of the third quadrant 2000Q3, the third one of the regions may include the remaining half portion of the third quadrant 2000Q3 and a half portion of the fourth quadrant 2000Q4, and the fourth one of the regions may include the remaining half portion of the fourth quadrant 2000Q4 and the remaining half portion of the first quadrant 2000Q1.

The first sensing routing line 221R may be extended from the first sensing pattern 221P in the second direction DR2 (or an opposite direction of the second direction DR2), may be extended to a region, in which the first cross line CSL1 is defined, in the clockwise direction, may be extended in the first cross direction DR1c (or an opposite direction of the first cross direction DR1c), may be extended to a region, in which the second reference line SL2 (see FIG. 7) is defined, in the counter-clockwise direction, may be extended in the second direction DR2 (or an opposite direction of the second direction DR2), may be extended to a region, in which the first cross line CSL1 is defined, in the clockwise direction, may be extended in the first cross direction DR1c (or an opposite direction of the first cross direction DR1c), may be extended to a region, in which the second reference line SL2 (see FIG. 7) is defined, in the counter-clockwise direction, and then may be extended to the peripheral region 2000N in the second direction DR2 (or an opposite direction of the second direction DR2).

First to fourth boundaries 20QB1, 20QB2, 20QB3, and 20QB4 may be defined to define borders of the first to fourth quadrants 2000Q1, 2000Q2, 2000Q3, and 2000Q4. For example, the first boundary 20QB1 may be defined between the first quadrant 2000Q1 and the second quadrant 2000Q2, the second boundary 20QB2 may be defined between the second quadrant 2000Q2 and the third quadrant 2000Q3, the third boundary 20QB3 may be defined between the third quadrant 2000Q3 and the fourth quadrant 2000Q4, and the fourth boundary 20QB4 may be defined between the fourth quadrant 2000Q4 and the first quadrant 2000Q1.

The first sensing routing line 221R may be extended from the active region 2000A to the peripheral region 2000N at the third boundary 20QB3, and the second sensing routing line 222R1 may be extended from the active region 2000A to the peripheral region 2000N at the second boundary 20QB2, and the second opposite sensing routing line 222R2 may extended from the active region 2000A to the peripheral region 2000N at the fourth boundary 20QB4.

The first sensing patterns 221P and the second sensing patterns 222P1 and 222P2 disposed in the first ring region RA1 may also be referred to as first reception patterns 221P, 222P1, and 222P2. The first sensing routing line 221R, the second sensing routing line 222R1, and the second opposite sensing routing line 222R2 may also be referred to as first reception routing lines 221R, 222R1, and 222R2.

The first reception routing lines 221R, 222R1, and 222R2 may be electrically connected to the first reception patterns 221P, 222P1, and 222P2, respectively. In the active region 2000A, a portion of the first reception routing line 222R1, which is one of the first reception routing lines 221R, 222R1, and 222R2, may be disposed in the second quadrant 2000Q2 and extend into the peripheral region 2000N in the third quadrant 2000Q3. In the active region 2000A, a portion of the first reception routing line 221R, which is another of the first reception routing lines 221R, 222R1, and 222R2, may be disposed in the third quadrant 2000Q3 and extend into the peripheral region 2000N. In the active region 2000A, a portion of the first reception routing line 222R2, which is other of the first reception routing lines 221R, 222R1, and 222R2, may be disposed in the fourth quadrant 2000Q4 and extend into the peripheral region 2000N. The portion of the first reception routing line 222R1, the portion of the first reception routing line 221R, and the portion of the first reception routing line 222R2 may be provided to have a rotational symmetry. They may also have serpentine shapes in the active region 2000A.

Figure 9:
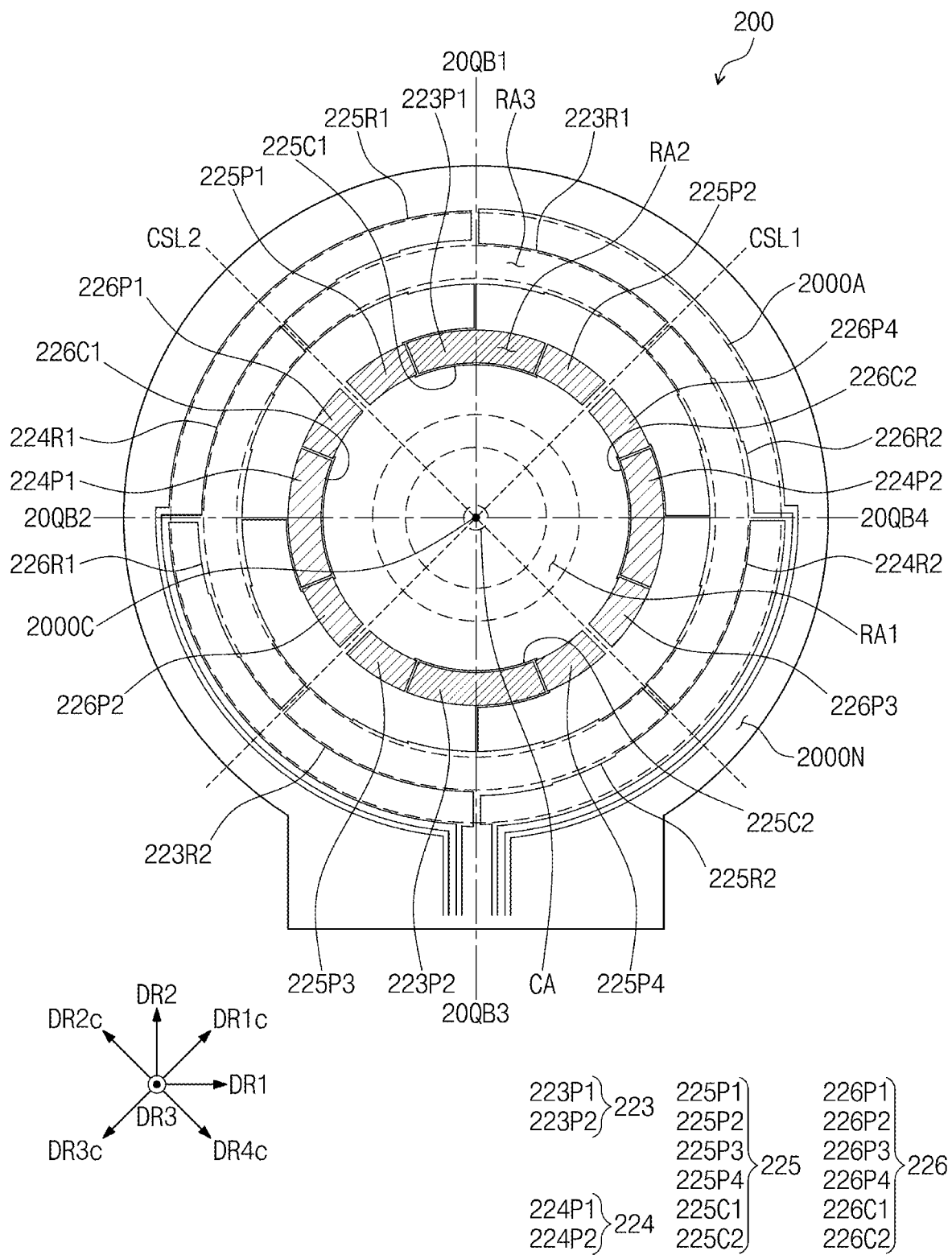
FIG. 9 is a plan view illustrating some elements constituting a sensor layer according to an embodiment of the inventive concept.

FIG. 9 is a plan view illustrating some elements constituting a sensor layer according to an embodiment of the inventive concept.

FIG. 9 illustrates a third sensing electrode 223, a fourth sensing electrode 224, a fifth sensing electrode 225, a sixth sensing electrode 226, a third sensing routing line 223R1, a third opposite sensing routing line 223R2, a fourth sensing routing line 224R1, a fourth opposite sensing routing line 224R2, a fifth sensing routing line 225R1, a fifth opposite sensing routing line 225R2, a sixth sensing routing line 226R1, and a sixth opposite sensing routing line 226R2, which are included in the sensor layer 200. The key in the bottom right of FIG. 9 illustrates the elements that make up the third sensing electrode 223, the fourth sensing electrode 224, the fifth sensing electrode 225, and the sixth sensing electrode 226.

The third sensing electrode 223 may include two third sensing patterns 223P1 and 223P2, which are spaced apart from each other with the center region CA interposed therebetween. The fourth sensing electrode 224 may include two fourth sensing patterns 224P1 and 224P2, which is are spaced apart from each other with the center region CA interposed therebetween. The third sensing patterns 223P1 and 223P2 may be spaced apart from each other in the second direction DR2, and the fourth sensing patterns 224P1 and 224P2 may be spaced apart from each other in the first direction DR1.

The fifth sensing electrode 225 may include four fifth sensing patterns 225P1, 225P2, 225P3, and 225P4, which are spaced apart from each other, and the third sensing patterns 223P1 and 223P2 may be interposed between respective corresponding pairs of the fifth sensing patterns 225P1, 225P2, 225P3, and 225P4. The sixth sensing electrode 226 may include four sixth sensing patterns 226P1, 226P2, 226P3, and 226P4, which are spaced apart from each other, and the fourth sensing patterns 224P1 and 224P2 may be interposed between respective corresponding pairs of the sixth sensing patterns 226P1, 226P2, 226P3, and 226P4.

For example, the fifth sensing patterns 225P1 and 225P2 may be spaced apart from each other with the third sensing pattern 223P1 interposed therebetween, and the fifth sensing patterns 225P3 and 225P4 may be spaced apart from each other with the third sensing pattern 223P2 interposed therebetween. The sixth sensing patterns 226P1 and 226P2 may be spaced apart from each other with the fourth sensing pattern 224P1 interposed therebetween, and the sixth sensing patterns 226P3 and 226P4 may be spaced apart from each other with the fourth sensing pattern 224P2 interposed therebetween. The third sensing pattern 223P1, the fifth sensing pattern 225P1, the sixth sensing pattern 226P1, the fourth sensing pattern 224P1, the sixth sensing pattern 226P2, the fifth sensing pattern 225P3, the third sensing pattern 223P2, the fifth sensing pattern 225P4, the sixth sensing pattern 226P3, the fourth sensing pattern 224P2, the sixth sensing pattern 226P4, and the fifth sensing pattern 225P2 may be sequentially disposed in the second ring region RA2 in the counter-clockwise direction.

The fifth sensing electrode 225 may further include a first cross connection portion 225C1 and a second cross connection portion 225C2. The sixth sensing electrode 226 may further include a third cross connection portion 226C1 and a fourth cross connection portion 226C2. The first cross connection portion 225C1 may electrically connect the fifth sensing patterns 225P1 and 225P2 to each other, and the second cross connection portion 225C2 may electrically connect the fifth sensing patterns 225P3 and 225P4 to each other. The third cross connection portion 226C1 may electrically connect the sixth sensing patterns 226P1 and 226P2 to each other, and the fourth cross connection portion 226C2 may electrically connect the sixth sensing patterns 226P3 and 226P4 to each other.

The third sensing routing line 223R1 may be connected to the third sensing pattern 223P1, and the third opposite sensing routing line 223R2 may be connected to the third sensing pattern 223P2. The fourth sensing routing line 224R1 may be connected to the fourth sensing pattern 224P1, and the fourth opposite sensing routing line 224R2 may be connected to the fourth sensing pattern 224P2.

The fifth sensing routing line 225R1 may be connected to the fifth sensing pattern 225P1. The fifth sensing patterns 225P1 and 225P2 and the first cross connection portion 225C1 may be electrically connected to the fifth sensing routing line 225R1. The fifth opposite sensing routing line 225R2 may be connected to the fifth sensing pattern 225P4. The fifth sensing patterns 225P3 and 225P4 and the second cross connection portion 225C2 may be electrically connected to the fifth opposite sensing routing line 225R2.

The sixth sensing routing line 226R1 may be connected to the sixth sensing pattern 226P2. The sixth sensing patterns 226P1 and 226P2 and the third cross connection portion 226C1 may be electrically connected to the sixth sensing routing line 226R1. The sixth opposite sensing routing line 226R2 may be connected to the sixth sensing pattern 226P4. The sixth sensing patterns 226P3 and 226P4 and the fourth cross connection portion 226C2 may be electrically connected to the sixth opposite sensing routing line 226R2.

The third sensing routing line 223R1, the third opposite sensing routing line 223R2, the fourth sensing routing line 224R1, the fourth opposite sensing routing line 224R2, the fifth sensing routing line 225R1, the fifth opposite sensing routing line 225R2, the sixth sensing routing line 226R1, and the sixth opposite sensing routing line 226R2 may be electrically connected to corresponding pads of the pads 200PD (e.g., see FIG. 3), respectively.

The third sensing routing line 223R1 and the sixth opposite sensing routing line 226R2 may be disposed in the first quadrant 2000Q1 and the fourth quadrant 2000Q4, the fifth sensing routing line 225R1 and the fourth sensing routing line 224R1 may be disposed in the second quadrant 2000Q2 and the third quadrant 2000Q3, the sixth sensing routing line 226R1 and the third opposite sensing routing line 223R2 may be disposed in the third quadrant 2000Q3, and the fifth opposite sensing routing line 225R2 and the fourth opposite sensing routing line 224R2 may be disposed in the fourth quadrant 2000Q4.

In the active region 2000A, the third sensing routing line 223R1, the fourth opposite sensing routing line 224R2, the third opposite sensing routing line 223R2, and the fourth sensing routing line 224R1 may be provided to have a rotational symmetry. For example, a portion of the third sensing routing line 223R1, a portion of the fourth opposite sensing routing line 224R2, a portion of the third opposite sensing routing line 223R2, and a portion of the fourth sensing routing line 224R1, which are disposed in the active region 2000A, may have substantially the same shape.

In the active region 2000A, the fifth sensing routing line 225R1, the sixth sensing routing line 226R1, the fifth opposite sensing routing line 225R2, and the sixth opposite sensing routing line 226R2 may be provided to have a rotational symmetry. For example, a portion of the fifth sensing routing line 225R1, a portion of the sixth sensing routing line 226R1, a portion of the fifth opposite sensing routing line 225R2, and a portion of the sixth opposite sensing routing line 226R2, which are disposed in the active region 2000A, may have substantially the same shape.

The third sensing routing line 223R1 and the fifth sensing routing line 225R1 may be extended from the active region 2000A to the peripheral region 2000N, at the first boundary 20QB1. The fourth sensing routing line 224R1 and the sixth sensing routing line 226R1 may be extended from the active region 2000A to the peripheral region 2000N, at the second boundary 20QB2. The third opposite sensing routing line 223R2 and the fifth opposite sensing routing line 225R2 may be extended from the active region 2000A to the peripheral region 2000N, at the third boundary 20QB3. The fourth opposite sensing routing line 224R2 and the sixth opposite sensing routing line 226R2 may be extended from the active region 2000A to the peripheral region 2000N, at the fourth boundary 20QB4.

The third sensing patterns 223P1 and 223P2, the fourth sensing patterns 224P1 and 224P2, the fifth sensing patterns 225P1, 225P2, 225P3, and 225P4, and the sixth sensing patterns 226P1, 226P2, 226P3, and 226P4, which are disposed in the second ring region RA2, may also be referred to as second reception patterns 223P1, 223P2, 224P1, 224P2, 225P1, 225P2, 225P3, 225P4, 226P1, 226P2, 226P3, and 226P4.

The third sensing routing line 223R1, the third opposite sensing routing line 223R2, the fourth sensing routing line 224R1, the fourth opposite sensing routing line 224R2, the fifth sensing routing line 225R1, the fifth opposite sensing routing line 225R2, the sixth sensing routing line 226R1, and the sixth opposite sensing routing line 226R2 may also be referred to as second reception routing lines 223R1, 223R2, 224R1, 224R2, 225R1, 225R2, 226R1, and 226R2.

A size of the second reception pattern 223P1, 223P2, 224P1, or 224P2, which is one of the second reception patterns 223P1, 223P2, 224P1, 224P2, 225P1, 225P2, 225P3, 225P4, 226P1, 226P2, 226P3, and 226P4 and is overlapped with the first and second reference lines SL1 and SL2 (e.g., see FIG. 7), may be larger than a size of the other (e.g., the second reception pattern 225P1, 225P2, 225P3, 225P4, 226P1, 226P2, 226P3, or 226P4). The other (i.e., the second reception pattern 225P1, 225P2, 225P3, 225P4, 226P1, 226P2, 226P3, or 226P4) may be one of the second reception patterns, which are not overlapped with the first and second reference lines SL1 and SL2 (e.g., see FIG. 7).

The second reception patterns 223P1, 223P2, 224P1, 224P2, 225P1, 225P2, 225P3, 225P4, 226P1, 226P2, 226P3, and 226P4 may be disposed outside the first reception patterns 221P, 222P1, and 222P2 (e.g., see FIG. 8), and the number of the second reception patterns 223P1, 223P2, 224P1, 224P2, 225P1, 225P2, 225P3, 225P4, 226P1, 226P2, 226P3, and 226P4 may be greater than the number of the first reception patterns 221P, 222P1, and 222P2 (e.g., see FIG. 8).

A portion of the second reception routing lines 223R1, 223R2, 224R1, 224R2, 225R1, 225R2, 226R1, and 226R2 overlapped with the first quadrant 2000Q1 (e.g., see FIG. 7), another portion of the second reception routing lines 223R1, 223R2, 224R1, 224R2, 225R1, 225R2, 226R1, and 226R2 overlapped with the second quadrant 2000Q2 (e.g., see FIG. 7), other portion of the second reception routing lines 223R1, 223R2, 224R1, 224R2, 225R1, 225R2, 226R1, and 226R2 overlapped with the third quadrant 2000Q3 (e.g., see FIG. 7), and still other portion of the second reception routing lines 223R1, 223R2, 224R1, 224R2, 225R1, 225R2, 226R1, and 226R2 overlapped with the fourth quadrant 2000Q4 (e.g., see FIG. 7) may be provided to have a rotational symmetry.

Figure 10:
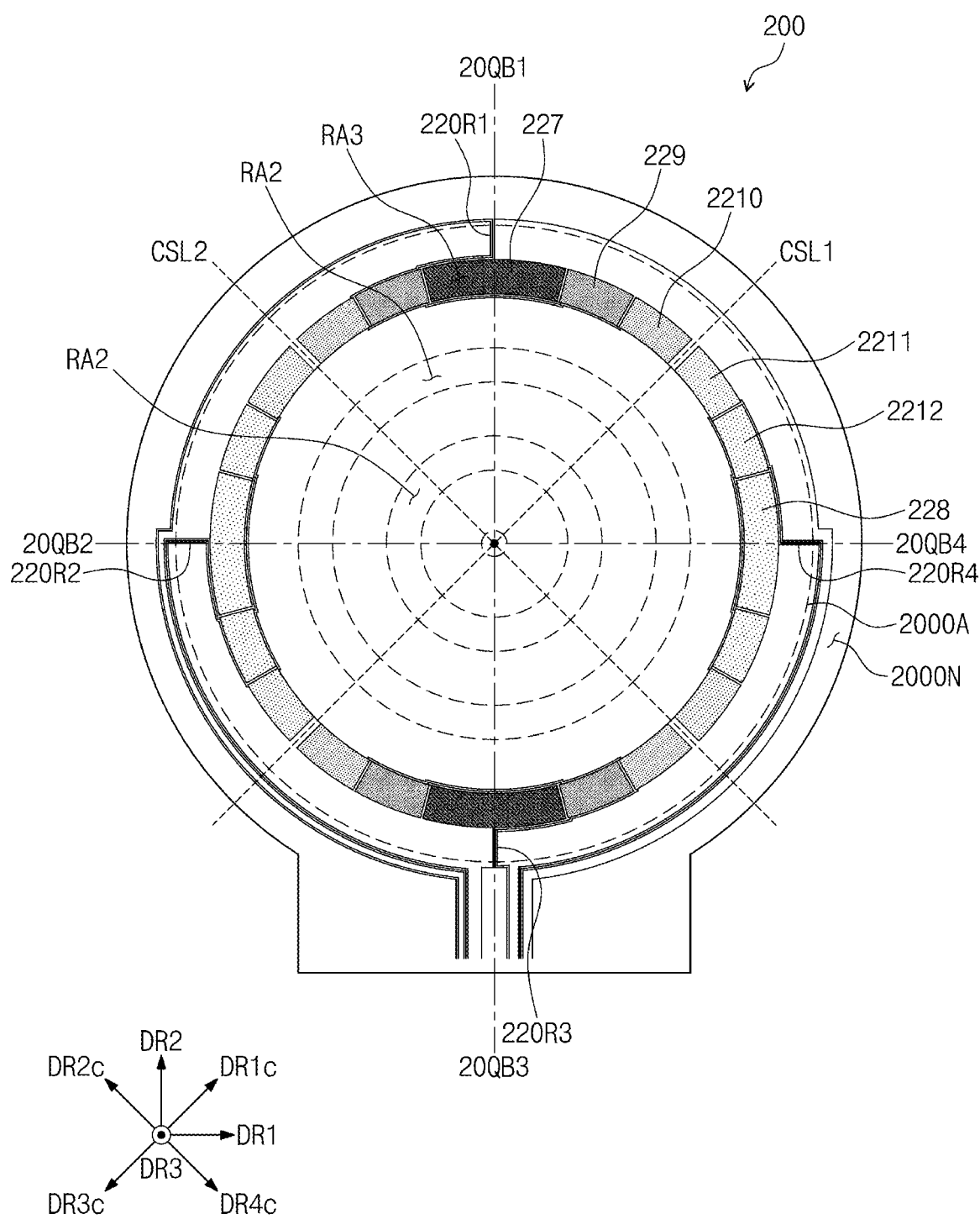
FIG. 10 is a plan view illustrating some elements constituting a sensor layer according to an embodiment of the inventive concept.

FIG. 10 is a plan view illustrating some elements constituting a sensor layer according to an embodiment of the inventive concept.

FIG. 10 illustrates a seventh sensing electrode 227, an eighth sensing electrode 228, a ninth sensing electrode 229, a tenth sensing electrode 2210, an eleventh sensing electrode 2211, a twelfth sensing electrode 2212, and twelve sensing routing lines 220R1, 220R2, 220R3, and 220R4, which are included in the sensor layer 200.

The twelve sensing routing lines 220R1, 220R2, 220R3, and 220R4 may include first sensing routing lines 220R1, second sensing routing lines 220R2, third sensing routing lines 220R3, and fourth sensing routing lines 220R4.

The first sensing routing lines 220R1 may be extended from the active region 2000A to the peripheral region 2000N, at the first boundary 20QB1. The second sensing routing line 220R2 may be extended from the active region 2000A to the peripheral region 2000N, at the second boundary 20QB2. The third sensing routing line 220R3 may be extended from the active region 2000A to the peripheral region 2000N, at the third boundary 20QB3. The fourth sensing routing line 220R4 may be extended from the active region 2000A to the peripheral region 2000N at the fourth boundary 20QB4.

In the active region 2000A, the first sensing routing lines 220R1, the second sensing routing lines 220R2, the third sensing routing lines 220R3, and the fourth sensing routing lines 220R4 may be provided to have a rotational symmetry. For example, portions of the first sensing routing lines 220R1, portions of the second sensing routing lines 220R2, portions of the third sensing routing lines 220R3, and portions of the fourth sensing routing lines 220R4, which are disposed in the active region 2000A, may have substantially the same shape.

As described with reference to FIGS. 7 to 10, some of the routing lines may be provided to have the rotational symmetry, with respect to others of the routing lines. Referring to FIGS. 7 to 10, in each of the first to fourth boundaries 20QB1, 20QB2, 20QB3, and 20QB4, six routing lines 200R (e.g., see FIG. 5) may be extended from the active region 2000A to the peripheral region 2000N. According to an embodiment of the inventive concept, the routing lines, which are extended from the active region 2000A to the peripheral region 2000N, may not be concentrated on a region near a specific boundary.

According to an embodiment of the inventive concept, near the first to fourth boundaries 20QB1, 20QB2, 20QB3, and 20QB4, the electrodes may be spaced apart from each other by a substantially constant distance. In detail, the distance between the first electrode 211 and the second electrode 212, the distance between the second electrode 212 and the third electrode 213, and the distance between the third electrode 213 and the fourth electrode 214 may be substantially uniform, as illustrated in FIG. 6. In addition, a distance between nodes defined in the sensor layer 200 may become uniform. Here, the node may be defined as a region including at least a portion of a single TX electrode and at least a portion of a single RX electrode.

In the case where, near the first to fourth boundaries 20QB1, 20QB2, 20QB3, and 20QB4, the distance between the electrodes is substantially uniform, a variation in distance between the nodes may be reduced. Furthermore, the distance between the nodes may have symmetry. In this case, it may be possible to improve linearity of touch points, which are sensed when inputs are successively applied in a linear manner. That is, the sensing performance of the sensor layer 200 may be improved.

Figure 11A:
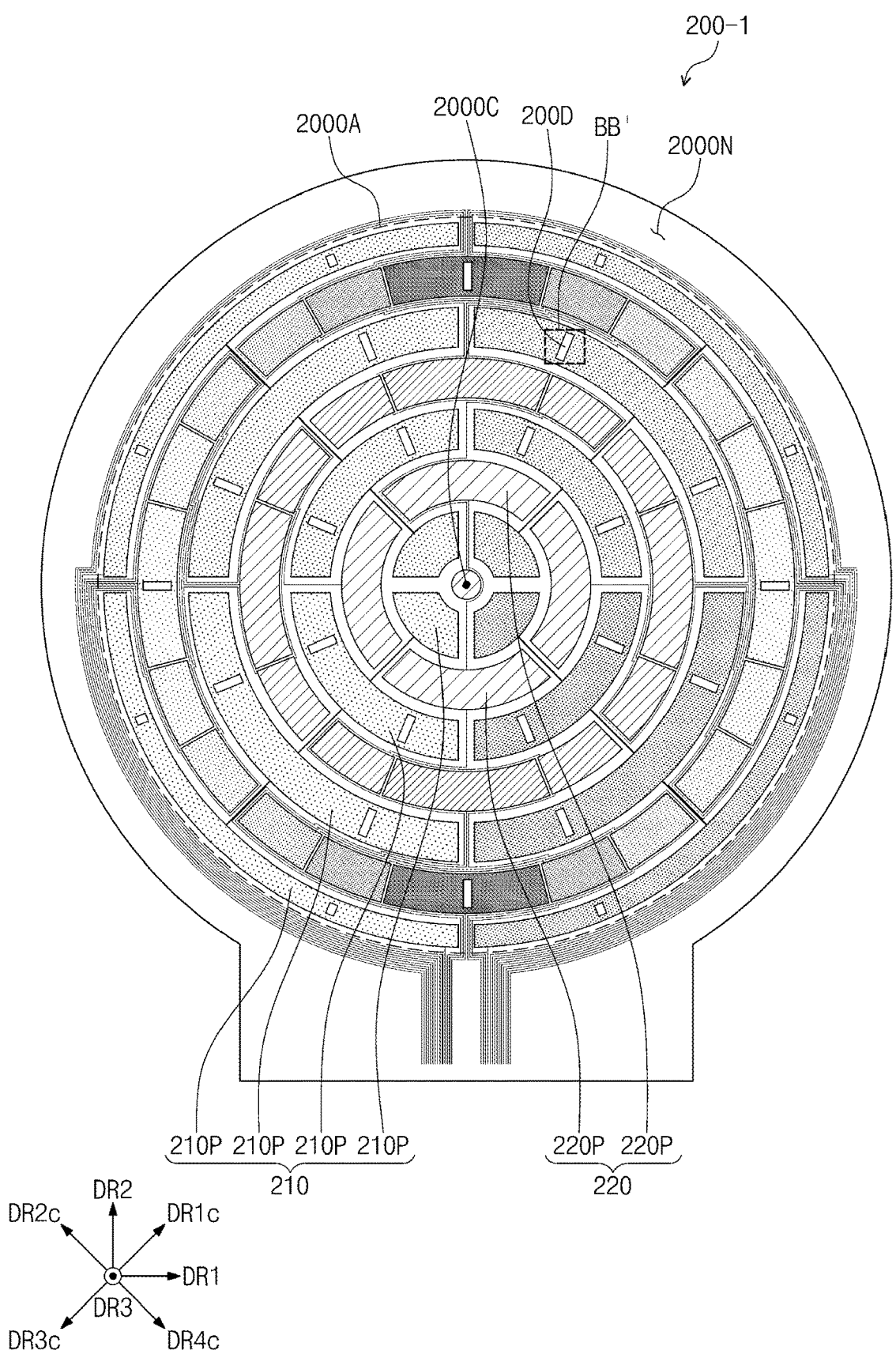
FIG. 11A is a plan view illustrating a sensor layer according to an embodiment of the inventive concept.
Figure 11B:
FIG. 11B is an enlarged plan view illustrating a portion BB' of FIG. 11A.
Figure 11B:
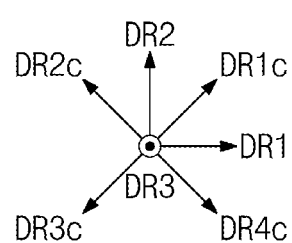

FIG. 11A is a plan view illustrating a sensor layer according to an embodiment of the inventive concept. FIG. 11B is an enlarged plan view illustrating a portion BB' of FIG. 11A. In the following description of FIGS. 11A and 11B, elements previously described with reference to FIGS. 5 to 10 may be identified by the same reference number without repeating an overlapping description thereof, for the sake of brevity.

Referring to FIG. 11A, a sensor layer 200-1 may further include an electrically-floated pattern 200D (hereinafter, a dummy pattern). In an embodiment, a plurality of dummy patterns 200D may be provided to have at least two different sizes, depending on their positions. For example, the dummy pattern 200D may be completely enclosed by the pattern 210P or the sensing pattern 220P. The dummy pattern 200D may be electrically separated from the pattern 210P and the sensing pattern 220P.

For example, the larger the number or area of the dummy pattern 200D, which is provided in each electrode 210 or each sensing electrode 220, the lower the base capacitance of the electrode 210 or the sensing electrode 220. The base capacitance may be called a parasitic capacitance and may refer to an electrostatic capacitance between the second electrode CE (e.g., see FIG. 4) and each of the electrodes 210 and the sensing electrodes 220.

According to an embodiment of the inventive concept, the base capacitance of each electrode 210 and each sensing electrode 220 may be controlled by the dummy pattern 200D. This may make it possible to reduce a positional variation in sensitivity of the sensor layer 200-1.

Referring to FIGS. 11A and 11B, the dummy pattern 200D may be defined by a cutting pattern 200CP, which is provided in the pattern 210P or the sensing pattern 220P. For example, each of the pattern 210P and the sensing pattern 220P may have a mesh structure. The cutting pattern 200CP may be defined as a region, which is formed by cutting a portion of the mesh structure. In other words, the cutting pattern 200CP may correspond to a line-shaped region, which is are formed by partially removing the mesh structure. The dummy pattern 200D may be provided by the cutting pattern 200CP.

According to an embodiment of the inventive concept, at least two lines of routing lines may be provided to have a rotational symmetry. Here, the routing lines may be extended from an active region to a peripheral region, near first to fourth boundaries of the active region. That is, the routing lines, which are extended from the active region to the peripheral region, may not be concentrated on a region near a specific boundary. Thus, a distance between electrodes near the first to fourth boundaries may be substantially uniform and moreover a distance of nodes defined in a sensor layer may be substantially uniform. In this case, it may be possible to improve linearity of touch points, which are sensed when inputs are successively applied in a linear manner. That is, the sensing performance of the sensor layer may be improved.

In addition, the sensor layer may further include an electrically-floated pattern. The larger the number or an area of a dummy pattern, which is provided in a single electrode or a single sensing electrode, the lower the base capacitance of the electrode or the sensing electrode. In other words, the base capacitance of each of the electrodes and the sensing electrodes may be controlled by the dummy pattern. This may make it possible to reduce a positional variation in sensitivity of the sensor layer.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device, comprising:
    a first sensing electrode provided in an active region, in which a center is defined, the first sensing electrode including a plurality of first sensing patterns, each of which is spaced apart from the center by a first distance;
    a second sensing electrode including a plurality of second sensing patterns, each of which is spaced apart from the center by the first distance;
    a first electrode including a plurality of first patterns, which are arranged in a direction away from the center;
    a second electrode including a plurality of second patterns, which are arranged in a direction away from the center;
    a first sensing routing line electrically connected to the first sensing electrode and disposed in the active region and a peripheral region around the active region; and
    a second sensing routing line electrically connected to one of the plurality of second sensing patterns and disposed in the active region and the peripheral region,
    wherein, in the active region, a portion of the first sensing routing line and a portion of the second sensing routing line have a rotational symmetry.

2. The electronic device of claim 1, further comprising:
a third electrode including a plurality of third patterns arranged in a direction away from the center; and
a fourth electrode including a plurality of fourth patterns arranged in a direction away from the center,
wherein the active region is divided into four quadrants, and the quadrants have a first quadrant, a second quadrant, a third quadrant, and a fourth quadrant, in which the first electrode, the second electrode, the third electrode, and the fourth electrode are respectively disposed.

3. The electronic device of claim 2, wherein the first electrode further comprises a first connection line connecting the plurality of first patterns, wherein:
the second electrode further includes a second connection line connecting the plurality of second patterns,
the third electrode further includes a third connection line connecting the plurality of third patterns,
the fourth electrode further includes a fourth connection line connecting the plurality of fourth patterns, and
each of the first connection line, the second connection line, the third connection line, and the fourth connection line is extended in a direction crossing reference lines, which defines the first to fourth quadrants.

4. The electronic device of claim 2, further comprising:
a first routing line electrically connected to the first electrode;
a second routing line electrically connected to the second electrode;
a third routing line electrically connected to the third electrode; and
a fourth routing line electrically connected to the fourth electrode, wherein:
the first routing line, the second routing line, the third routing line, and the fourth routing line are disposed in the peripheral region enclosing the active region,
the first routing line and the second routing line are symmetric to each other, about a reference line, which defines the first quadrant and the second quadrant and is extended in a specific direction, and
the third routing line and the fourth routing line are symmetric to each other, about the reference line.

5. The electronic device of claim 2, wherein the active region comprises a center region at the center and a first ring region enclosing the center region, wherein:
the plurality of first sensing patterns and the plurality of second sensing patterns are disposed in the first ring region,
the first sensing electrode further includes a first sensing connection line connecting the plurality of first sensing patterns, and
the first sensing connection line has a shape enclosing a portion of the center region.

6. The electronic device of claim 5, wherein each of the first sensing routing line and the second sensing routing line has a serpentine shape, in the active region, wherein:
the first sensing routing line is extended from the active region to the peripheral region, at one of boundaries between the first to fourth quadrants, and
the second sensing routing line is extended from the active region to the peripheral region, at another of the boundaries between the first to fourth quadrants.

7. The electronic device of claim 6, wherein the plurality of second sensing patterns are spaced apart from each other with the first sensing connection line interposed therebetween.

8. The electronic device of claim 7, further comprising:
a second opposite sensing routing line, which is electrically connected to another of the plurality of second sensing patterns,
wherein the second opposite sensing routing line is disposed in one of the first to fourth quadrants.

9. The electronic device of claim 8, wherein the first to fourth quadrants have borders that are defined by first to fourth boundaries, wherein:
the first sensing routing line is extended from the active region to the peripheral region enclosing the active region, at the third boundary,
the second sensing routing line is extended from the active region to the peripheral region at the second boundary, and
the second opposite sensing routing line is extended from the active region to the peripheral region at the fourth boundary.

10. The electronic device of claim 8, wherein, in the active region, the first sensing routing line, the second sensing routing line, and the second opposite sensing routing line are provided to have a rotational symmetry.

11. The electronic device of claim 5, further comprising:
a center electrode disposed in the center region; and
a center routing line electrically connected to the center electrode,
wherein the center routing line has a serpentine shape in two quadrants of the first to fourth quadrants.

12. The electronic device of claim 5, wherein the active region further comprises:
a second ring region enclosing the first ring region,
wherein the electronic device further includes:
a third sensing electrode including two third sensing patterns disposed in the second ring region;
a fourth sensing electrode including two fourth sensing patterns disposed in the second ring region;
a fifth sensing electrode including four fifth sensing patterns disposed in the second ring region; and
a sixth sensing electrode including four sixth sensing patterns disposed in the second ring region, and
the third sensing pattern, the fifth sensing pattern, the sixth sensing pattern, the fourth sensing pattern, the sixth sensing pattern, and the fifth sensing pattern are arranged repeatedly twice in the second ring region in a clockwise direction.

13. The electronic device of claim 12, further comprising:
a third sensing routing line electrically connected to one of the two third sensing patterns;
a third opposite sensing routing line electrically connected to the other of the two third sensing patterns;
a fourth sensing routing line electrically connected to one of the two fourth sensing patterns;
a fourth opposite sensing routing line electrically connected to the other of the two fourth sensing patterns;
a fifth sensing routing line electrically connected to two ones of the four fifth sensing patterns, which face each other with the one of the two third sensing patterns interposed therebetween;
a fifth opposite sensing routing line electrically connected to the other two ones of the four fifth sensing patterns, which face each other with the other of the two third sensing patterns interposed therebetween;
a sixth sensing routing line electrically connected to two ones of the four sixth sensing patterns, which face each other with one of the two fourth sensing patterns interposed therebetween; and a sixth opposite sensing routing line electrically connected to the other two ones of the four sixth sensing patterns, which face each other with the other of the two fourth sensing patterns interposed therebetween.

14. The electronic device of claim 13, wherein, in the active region, the third sensing routing line, the third opposite sensing routing line, the fourth sensing routing line, and the fourth opposite sensing routing line are provided to have a rotational symmetry, and wherein in the active region, the fifth sensing routing line, the fifth opposite sensing routing line, the sixth sensing routing line, and the sixth opposite sensing routing line are provided to have a rotational symmetry.

15. The electronic device of claim 13, wherein the first to fourth quadrants have borders that are defined by first to fourth boundaries, wherein:

two lines of the third sensing routing line, the third opposite sensing routing line, the fourth sensing routing line, the fourth opposite sensing routing line, the fifth sensing routing line, the fifth opposite sensing routing line, the sixth sensing routing line, and the sixth opposite sensing routing line are extended from the active region to the peripheral region enclosing the active region, at the first boundary, other two lines are extended from the active region to the peripheral region at the second boundary, still other two lines are extended from the active region to the peripheral region at the third boundary, and the remaining two lines are extended from the active region to the peripheral region at the fourth boundary.

16. The electronic device of claim 1, further comprising:
an electrically-floated pattern,
wherein the electrically-floated pattern is disposed in a region, which is enclosed by one of the plurality of first patterns and the plurality of second patterns.

* * * * *